(12) United States Patent
Takatsukasa

(10) Patent No.: US 10,044,499 B2
(45) Date of Patent: Aug. 7, 2018

(54) INFORMATION PROCESSING APPARATUS, PROGRAM, AND STORAGE MEDIUM

(71) Applicant: FUJI ELECTRIC CO., LTD., Kanagawa (JP)

(72) Inventor: Kenji Takatsukasa, Tokyo (JP)

(73) Assignee: FUJI ELECTRIC CO., LTD., Kawasaki-shi, Kanagawa (JP)

( * ) Notice: Subject to any disclaimer, the term of this patent is extended or adjusted under 35 U.S.C. 154(b) by 402 days.

(21) Appl. No.: 14/917,331

(22) PCT Filed: Feb. 4, 2015

(86) PCT No.: PCT/JP2015/053076
§ 371 (c)(1),
(2) Date: Mar. 8, 2016

(87) PCT Pub. No.: WO2015/156020
PCT Pub. Date: Oct. 15, 2015

(65) Prior Publication Data
US 2016/0226660 A1 Aug. 4, 2016

(30) Foreign Application Priority Data
Apr. 10, 2014 (JP) ................. 2014-081338

(51) Int. Cl.
*H04L 9/06* (2006.01)
*G09C 1/00* (2006.01)
*H04L 9/32* (2006.01)

(52) U.S. Cl.
CPC .............. *H04L 9/0637* (2013.01); *G09C 1/00* (2013.01); *H04L 9/0631* (2013.01);
(Continued)

(58) Field of Classification Search
CPC ..... H04L 9/06; H04L 9/00; H04L 9/30; H04L 9/18; H04L 9/0637; H04L 2209/122;
(Continued)

(56) References Cited

U.S. PATENT DOCUMENTS 8,767,957 B1* 7/2014 Bagchi ................ H04L 63/0428
380/28
9,680,653 B1* 6/2017 Bradbury ............. H04L 9/3242
(Continued)

FOREIGN PATENT DOCUMENTS

JP 2014-002230 1/2014

OTHER PUBLICATIONS

Seog Chung Seo et al., TinyECCK: Efficient Elliptic Curve Cryptography Implementation over GF(2m) on 8-Bit Micaz Mote, IEICE Transactions on Information and Systems, vol. E91-D No. 5, May 1, 2008, pp. 1338-1347, especially 4. Implementation Details (Year: 2008).*

(Continued)

*Primary Examiner* — Farid Homayounmehr
*Assistant Examiner* — Sanchit K Sarker
(74) *Attorney, Agent, or Firm* — IPUSA, PLLC

(57) ABSTRACT

An information processing apparatus has an encryption part that encrypts by block encryption, and is embeddable in an electronic apparatus, and achieves the above object by segmenting an authentication target message into one or more blocks for every 128 bits, the authentication target message including at least a predetermined authentication parameter and first encryption information that is obtained by encrypting plaintext information by the encryption part, successively computing each of the one or more segmented blocks by a GHASH function including a predetermined algorithm, using a plurality of 8-bit arrays including 16 elements, and generating second encryption information that (Continued)

is obtained by encrypting a computed result by the encryption part, to generate an authentication tag.

6 Claims, 16 Drawing Sheets

(52) U.S. Cl.
CPC .......... *H04L 9/0643* (2013.01); *H04L 9/3236* (2013.01); *H04L 9/3239* (2013.01); *H04L 2209/122* (2013.01)

(58) Field of Classification Search
CPC ... H04L 9/0643; H04L 9/3239; H04L 9/0631; H04L 9/3236; G09C 1/00; G06F 7/725
See application file for complete search history.

(56) References Cited

U.S. PATENT DOCUMENTS

| | | | | |
|---|---|---|---|---|
| 2006/0126835 A1* | 6/2006 | Kim | .................. | H04L 9/0637 380/44 |
| 2006/0170666 A1* | 8/2006 | Guillemot | ............... | G09G 3/00 345/204 |
| 2008/0240423 A1* | 10/2008 | Gueron | ................. | G06F 7/724 380/28 |
| 2008/0279368 A1* | 11/2008 | Yen | ..................... | H04L 9/0637 380/28 |
| 2009/0080646 A1* | 3/2009 | Yen | ..................... | G06F 7/724 380/28 |
| 2009/0278878 A1* | 11/2009 | Kubo | .................. | B41J 2/04546 347/12 |
| 2010/0027783 A1* | 2/2010 | Yup | ..................... | H04L 9/0631 380/44 |
| 2010/0303229 A1* | 12/2010 | Unruh | ................. | H04L 9/0637 380/28 |
| 2011/0103578 A1* | 5/2011 | Orlando | ............... | H04L 9/0637 380/28 |
| 2016/0226660 A1* | 8/2016 | Takatsukasa | ......... | H04L 9/0637 |

OTHER PUBLICATIONS

David A Mcgrew et al: "The Galois/Counter Mode of Operation (GCM)", Progress in cryptology—INDOCRYPT 2004 : 5th International Conference on Cryptology in India, Chennai, India, Dec. 20-22, 2004 (Year: 2004).*

David A Mcgrew et al: "The Galois/Counter Mode of Operation (GCM)", Progress in cryptology—INDOCRYPT 2004 : 5th International Conference on Cryptology in India, Chennai, India, Dec. 20-22, 2004 ; proceedings, May 31, 2005 (May 31, 2005), XP055285316, DE ISBN: 978-3-540-24130-0 Retrieved from the Internet: URL:http://csrc.nist.gov/groups/ST/toolkit/BCM/documents/proposedmodes/gcm/gcm-revised-spec.pdf [retrieved on Jul. 1, 2016] *sections 2.3 and 4.1 algorithms1 and 2; table 1*.

Anonymous: "Loop unrolling—Wikipedia, the free encyclopedia", Mar. 12, 2014 (Mar. 12, 2014), XP055285848, Retrieved from the Internet: URL: https://en.wikipedia.org/w/index.php?title=Loop_unrolling&oldid=599302432 [retrieved on Jul. 5, 2016] *the whole document*.

Extended European Search Report dated Jul. 13, 2016 issued with respect to the corresponding European Patent Application No. 15776988.6.

Morris Dworkin, Recommendation for Block Cipher Modes of Operation: Galois/Counter Mode (GCM) and GMAC, NIST Special Publication 800-38D[online], Nov. 2007, [retrieved on Apr. 22, 2015], Retrieved from the Internet:<URL:http://csrc.nist.gov/publications/PubsSPs.html>.

Darrel Hankerson et al., Guide to Elliptic Curve Cryptography, Springer-Verlag New York, Inc., 2004, pp. 47-56, 215, 216.

Seog Chung Seo et al., TinyECCK: Efficient Elliptic Curve Cryptography Implementation over GF(2m) on 8-Bit Micaz Mote, IEICE Transactions on Information and Systems, vol. E91-D No. 5, May 1, 2008, pp. 1338-1347, especially 4. Implementation Details.

Cetin Kaya Koc: "High-Speed RSA Implementation", RSA Laboratories Bulletin, XX, XX, Jan. 1, 1994 (Jan. 1, 1994), pp. 1-70, XP002327867.

Office Action dated Dec. 22, 2017 issued with respect to the corresponding European Patent Application No. 15776988.6.

\* cited by examiner

FIG.9

```
Rmap[256] = {
0x0000, 0x01C2, 0x0384, 0x0246, 0x0708, 0x06CA, 0x048C, 0x054E,
0x0E10, 0x0FD2, 0x0D94, 0x0C56, 0x0918, 0x08DA, 0x0A9C, 0x0B5E,
0x1C20, 0x1DE2, 0x1FA4, 0x1E66, 0x1B28, 0x1AEA, 0x18AC, 0x196E,
0x1230, 0x13F2, 0x11B4, 0x1076, 0x1538, 0x14FA, 0x16BC, 0x177E,
0x3840, 0x3982, 0x3BC4, 0x3A06, 0x3F48, 0x3E8A, 0x3CCC, 0x3D0E,
0x3650, 0x3792, 0x35D4, 0x3416, 0x3158, 0x309A, 0x32DC, 0x331E,
0x2460, 0x25A2, 0x27E4, 0x2626, 0x2368, 0x22AA, 0x20EC, 0x212E,
0x2A70, 0x2BB2, 0x29F4, 0x2836, 0x2D78, 0x2CBA, 0x2EFC, 0x2F3E,
0x7080, 0x7142, 0x7304, 0x72C6, 0x7788, 0x764A, 0x740C, 0x75CE,
0x7E90, 0x7F52, 0x7D14, 0x7CD6, 0x7998, 0x785A, 0x7A1C, 0x7BDE,
0x6CA0, 0x6D62, 0x6F24, 0x6EE6, 0x6BA8, 0x6A6A, 0x682C, 0x69EE,
0x62B0, 0x6372, 0x6134, 0x60F6, 0x65B8, 0x647A, 0x663C, 0x67FE,
0x48C0, 0x4902, 0x4B44, 0x4A86, 0x4FC8, 0x4E0A, 0x4C4C, 0x4D8E,
0x46D0, 0x4712, 0x4554, 0x4496, 0x41D8, 0x401A, 0x425C, 0x439E,
0x54E0, 0x5522, 0x5764, 0x56A6, 0x53E8, 0x522A, 0x506C, 0x51AE,
0x5AF0, 0x5B32, 0x5974, 0x58B6, 0x5DF8, 0x5C3A, 0x5E7C, 0x5FBE,
0xE100, 0xE0C2, 0xE284, 0xE346, 0xE608, 0xE7CA, 0xE58C, 0xE44E,
0xEF10, 0xEED2, 0xEC94, 0xED56, 0xE818, 0xE9DA, 0xEB9C, 0xEA5E,
0xFD20, 0xFCE2, 0xFEA4, 0xFF66, 0xFA28, 0xFBEA, 0xF9AC, 0xF86E,
0xF330, 0xF2F2, 0xF0B4, 0xF176, 0xF438, 0xF5FA, 0xF7BC, 0xF67E,
0xD940, 0xD882, 0xDAC4, 0xDB06, 0xDE48, 0xDF8A, 0xDDCC, 0xDC0E,
0xD750, 0xD692, 0xD4D4, 0xD516, 0xD058, 0xD19A, 0xD3DC, 0xD21E,
0xC560, 0xC4A2, 0xC6E4, 0xC726, 0xC268, 0xC3AA, 0xC1EC, 0xC02E,
0xCB70, 0xCAB2, 0xC8F4, 0xC936, 0xCC78, 0xCDBA, 0xCFFC, 0xCE3E,
0x9180, 0x9042, 0x9204, 0x93C6, 0x9688, 0x974A, 0x950C, 0x94CE,
0x9F90, 0x9E52, 0x9C14, 0x9DD6, 0x9898, 0x995A, 0x9B1C, 0x9ADE,
0x8DA0, 0x8C62, 0x8E24, 0x8FE6, 0x8AA8, 0x8B6A, 0x892C, 0x88EE,
0x83B0, 0x8272, 0x8034, 0x81F6, 0x84B8, 0x857A, 0x873C, 0x86FE,
0xA9C0, 0xA802, 0xAA44, 0xAB86, 0xAEC8, 0xAF0A, 0xAD4C, 0xAC8E,
0xA7D0, 0xA612, 0xA454, 0xA596, 0xA0D8, 0xA11A, 0xA35C, 0xA29E,
0xB5E0, 0xB422, 0xB664, 0xB7A6, 0xB2E8, 0xB32A, 0xB16C, 0xB0AE,
0xBBF0, 0xBA32, 0xB874, 0xB9B6, 0xBCF8, 0xBD3A, 0xBF7C, 0xBEBE
}
```

INFORMATION PROCESSING APPARATUS, PROGRAM, AND STORAGE MEDIUM

TECHNICAL FIELD

The present invention relates to an information processing apparatus, a program, and a storage medium.

BACKGROUND ART

Recently, from a viewpoint of security, the need to implement an encryption function is increasing also with respect to an embedded device. An example of an encryption scheme used for such an encryption function includes AES (Advanced Encryption Standard)-GCM (Galois/Counter Mode) that uses GCM as a block cipher mode of operation of AES that is a symmetric key encryption scheme.

An encryption algorithm ε used for the AES-GCM utilizes a secret key K, an initial vector IV, a plaintext message P, and an authentication parameter A as inputs, and outputs a ciphertext C and an authentication tag T. The encryption algorithm ε may be represented by the following formula:

$$\varepsilon_K(IV,P,A)=(C,T)$$

where the authentication parameter A is a data that is not encrypted and is used only for the authentication.

The encryption algorithm ε used for the AES-GCM described above is formed by an AES encryption function, a GCTR function, and a GHASH function (for example, refer to Non-Patent Document 1).

PRIOR ART DOCUMENTS

Non-Patent Documents

Non-Patent Document 1: NIST: Recommendation for Block Cipher Modes of Operation: Galois/Counter Mode (GCM) and GMAC, NIST Special Publication 800-38D, November 2007

DISCLOSURE OF THE INVENTION

Problem to be Solved by the Invention

A CPU (Central Processing Unit), an MPU (Micro Processing Unit), a ROM (Read Only Memory), or the like implemented in the embedded device are relatively inexpensive compared to those implemented in a general-purpose computer system. Accordingly, in order to reduce a computing time using limited hardware resource in the embedded device, it is necessary to implement the encryption algorithm ε described above using an efficient algorithm.

On the other hand, in the encryption algorithm ε described above, a computing time of a GHASH function that is used to generate the authentication tag T greatly affects the computing time of the entire encryption algorithm ε. Hence, the computing time of the entire encryption algorithm ε can be reduced by optimizing the algorithm of the GHASH function and reducing the computing time of the GHASH function.

One embodiment of the present invention is conceived in view of the above, and one object of the embodiment is to perform an efficient computation of the GHASH function.

Means of Solving the Problem

In order to achieve the object described above, one embodiment of the present invention provides an information processing apparatus having an encryption part that encrypts by block encryption, and is embeddable in an electronic apparatus, and includes segmenting an authentication target message into one or more blocks for every 128 bits, the authentication target message including at least a predetermined authentication parameter and first encryption information that is obtained by encrypting plaintext information by the encryption part, successively computing each of the one or more segmented blocks by a GHASH function including a predetermined algorithm, using a plurality of 8-bit arrays including 16 elements, and generating second encryption information that is obtained by encrypting a computed result by the encryption part, to generate an authentication tag.

Effects of the Invention

According to one embodiment of the present invention, it is possible to perform an efficient computation of a GHASH function.

BRIEF DESCRIPTION OF THE DRAWING

FIG. 9 is a configuration diagram of an example of a conversion table;

MODE OF CARRYING OUT THE INVENTION

Figure 1:
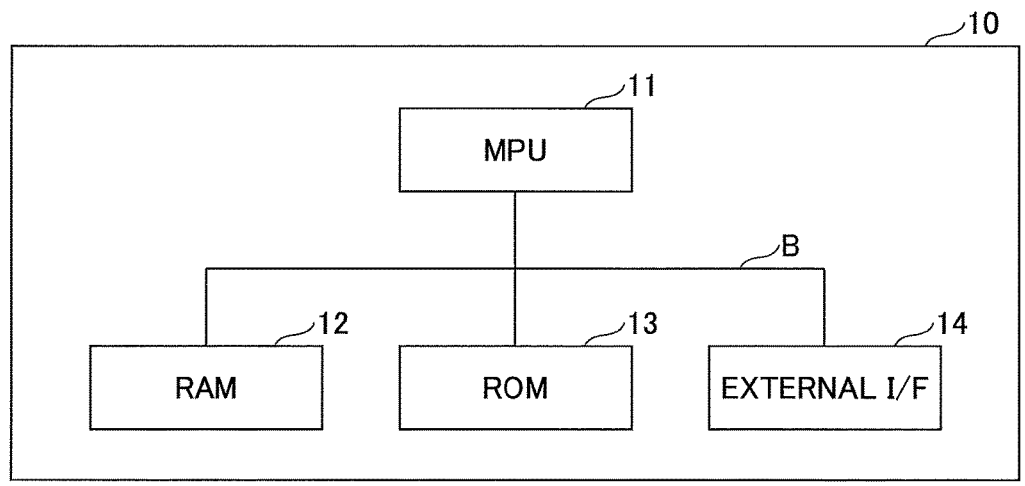
FIG. 1 is a hardware configuration diagram of an example of an information processing apparatus in a first embodiment.

A description will be given of embodiments of the present invention, by referring to the drawings. In this specification and the drawings, constituent elements having substantially the same functional configuration are designated by the same reference numerals, and a description thereof will not be repeated.

First Embodiment

<Hardware Configuration>

A description will be given of an example of a configuration of an information processing apparatus capable of executing various processes in this embodiment. FIG. 1 is a hardware configuration diagram of an example of the information processing apparatus in a first embodiment.

As illustrated in FIG. 1, an information processing apparatus 10 includes an MPU 11, a RAM (Random Access Memory) 12, a ROM 13, and an external I/F 14. In addition, these constituent parts of the information processing apparatus 10 are mutually connected via a bus B.

The MPU 11 is an arithmetic and logic unit that controls the entire information processing apparatus 10 and performs functions of the information processing apparatus 10, by reading programs and data (for example, programs and data for realizing this embodiment) stored in the ROM 13 into the RAM 12 to execute the processes.

The RAM 12 is a volatile semiconductor memory (storage device) that temporarily retains the programs and the data.

The ROM 13 is a nonvolatile semiconductor memory (storage device) that can retain the programs and the data even when power is cut off.

The external I/F 14 is an interface for connecting the information processing apparatus 10 to an external apparatus. For example, a communication device, such as a LAN (Local Area Network) controller, or an auxiliary storage device (storage medium), such as an USB (Universal Serial Bus) memory, is connected to the external I/F 14. For this reason, the programs and the data for realizing this embodiment, stored in the auxiliary storage device, for example, may be read into the RAM 12 via the external I/F 14.

The hardware configuration of the information processing apparatus 10 in this embodiment illustrated in FIG. 1 is one example, and the information processing apparatus 10 may have other arbitrary hardware configurations.

In the following description, it is assumed that the information processing apparatus 10 in this embodiment is a so-called embedded system that is embedded in another electronic apparatus, such as an industrial apparatus, a home appliance, or the like. Accordingly, it is assumed that performances and capacities of the MPU 11, the RAM 12, and the ROM 13 provided in the information processing apparatus 10 in this embodiment are considerably low compared to those of the general-purpose computer system, such as a PC (Personal Computer). In other words, the hardware resources of the information processing apparatus 10 in this embodiment are limited compared to those of the general-purpose computer system.

The information processing apparatus 10 in this embodiment is not limited to the embedded system, and may be the general-purpose computer system, such as the PC. In this case, the information processing apparatus 10 may be provided with an auxiliary storage device, such as an HDD (Hard Disk Drive) or the like, an input device, such as a keyboard, a mouse or the like, and a display device, such as a display or the like, for example.

<Functional Configuration>

Figure 2:
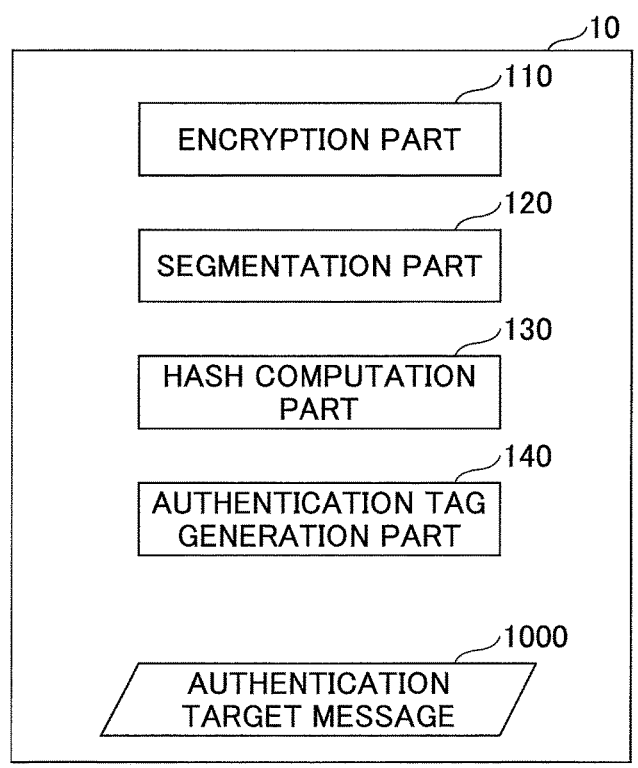
FIG. 2 is a functional configuration diagram of the example of the information processing apparatus in the first embodiment.

Next, a description will be given of a functional configuration of the information processing apparatus 10 in this embodiment. FIG. 2 is a functional configuration diagram of the example of the information processing apparatus in the first embodiment.

The information processing apparatus 10 includes an encryption part 110, a segmentation part 120, a hash computation part 130, an authentication tag generation part 140, and an authentication target message 1000.

The encryption part 110 encrypts input information using a GCTR function based on a given secret key K and an initial vector IV. An encryption function used by the GCTR function may be an arbitrary encryption function (encryption engine) used for block encryption. That is, the encryption function that is used, other than the AES encryption function used by the AES-GCM, may be an encryption function, that performs the encryption in DES (Data Encryption Standard), triple DES, Camellia, or the like, for example. In the following, a description will be given of a case in which the encryption part 110 of the information processing apparatus 10 in this embodiment computes the GCTR function using, as the encryption function, the AES encryption function. In other words, it is assumed that the information processing apparatus 10 in this embodiment performs the encryption by AES-GCM.

The segmentation part 120 performs a process of segmenting the authentication target message 1000 into blocks for every 128 bits.

The hash computation part 130 inputs the authentication target message 1000, segmented into the blocks for every 128 bits by the segmentation part 120, to perform computation of the GHASH function.

The authentication tag generation part 140 generates the authentication tag T from information that is obtained by encrypting a computation result (hash value) of the GHASH function by the encryption part 110. For example, the authentication tag generation part 140 generates the authentication tag T by extracting a predetermined number of upper bits of the hash value of the encrypted GHASH function.

The authentication target message 1000 is an input data to the GHASH function. For example, the authentication target message 1000 has a configuration illustrated in FIG. 3. The authentication target message 1000 is stored in the storage device, such as the ROM 13 or the like, for example.

Figure 3:
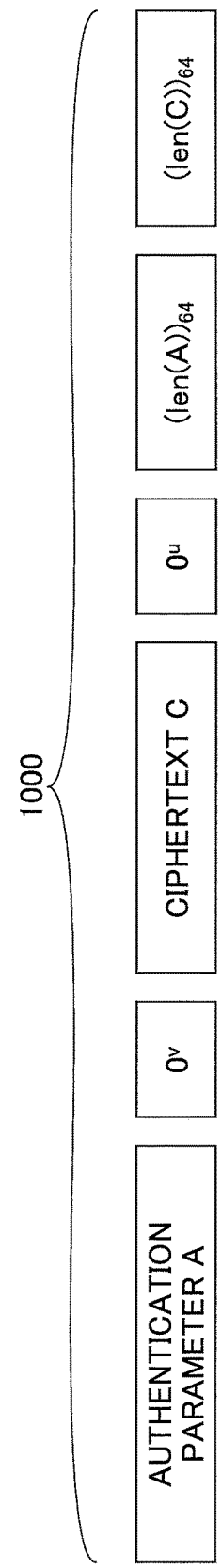
FIG. 3 is a configuration diagram of an example of an authentication target message.

FIG. 3 is a configuration diagram of an example of the authentication target message. The authentication target message 1000 illustrated in FIG. 3 is formed by an authentication parameter A, a 0 having predetermined v bits, a ciphertext C, a 0 having predetermined u bits, a bit string represented by $(len(A))_{64}$, and a bit string represented by $(len(C))_{64}$.

The authentication parameter A is non-encrypted predetermined information that is determined in advance between an encrypting end and a decrypting end. The authentication parameter A is the information that can be determined arbitrarily between the encrypting end and the decrypting end.

In addition, v and u described above are defined by the following formulas, respectively:

$$v = 128 \cdot \lceil len(A)/128 \rceil - len(A)$$

$$u = 128 \cdot \lceil len(C)/128 \rceil - len(C)$$

where len(A) and len(C) are bit string lengths of the authentication parameter A and the ciphertext C, respectively. In addition, [len(A)/128] and [len(C)/128] are minimum integers that are greater than or equal to len(A)/128 and greater than or equal to len(C)/128, respectively.

The ciphertext C is obtained by encrypting non-encrypted plaintext information P by the encryption part 110. In addition, $(\text{len}(A))_{64}$ and $(\text{len}(C))_{64}$ are a bit string representing len(A) in 64 bits and a bit string representing len(C) in 64 bits, respectively.

By generating the authentication tag T based on the authentication target message 1000 having the configuration described above, the decrypting end that decrypts the ciphertext C can authenticate completeness of the received ciphertext C and identity of the decrypting end.

<Details of Process>

Next, a description will be given of details of the process of the information processing apparatus 10 in this embodiment, by referring to the drawings.

<<Authentication Tag Generation Process>>

Figure 4:
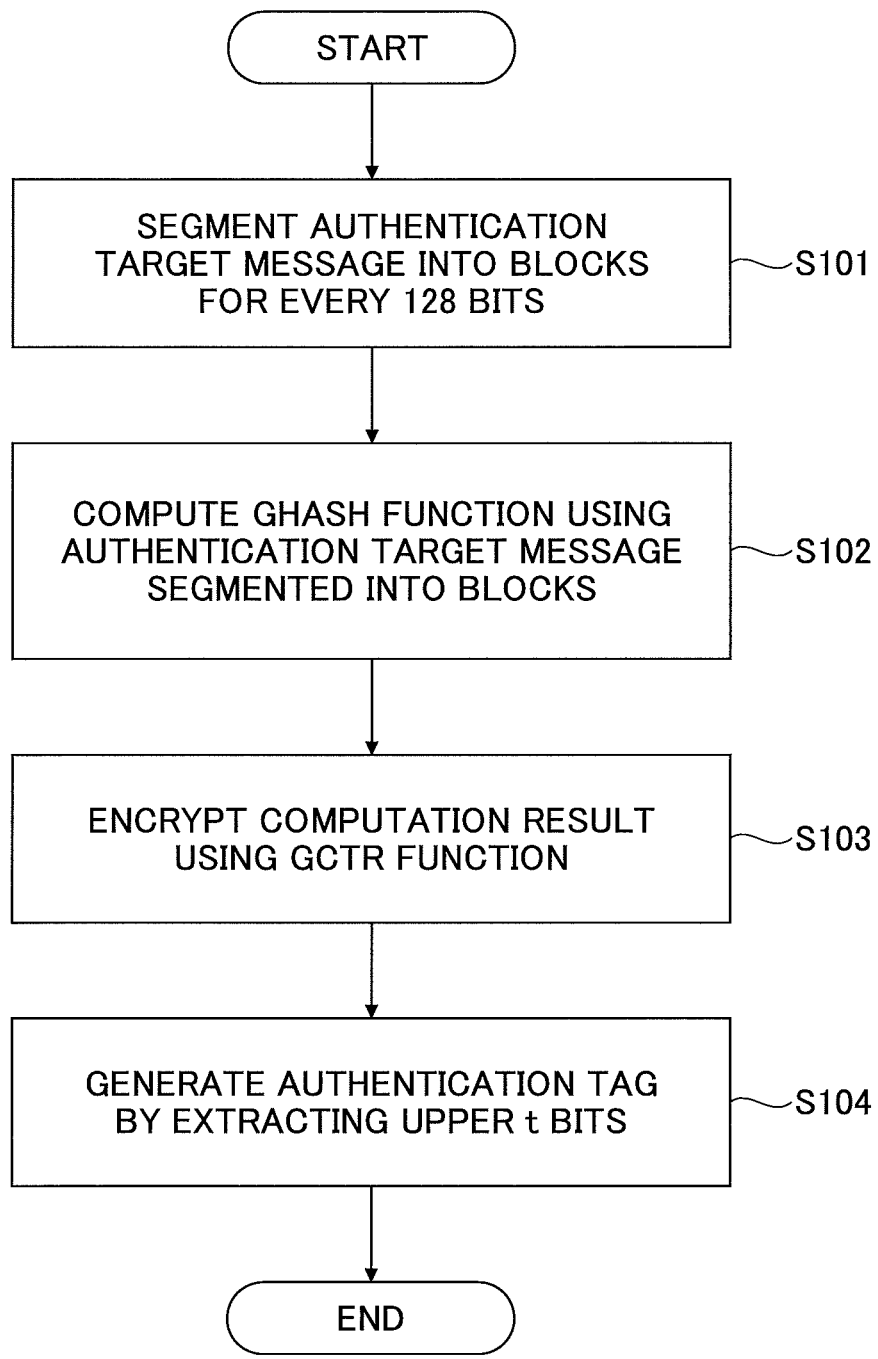
FIG. 4 is a flow chart of an example of an authentication tag generating process in the first embodiment.

First, a description will be given of an authentication tag generation process. FIG. 4 is a flow chart of an example of the authentication tag generating process in the first embodiment.

The segmentation part 120 segments the authentication target message 1000 into the blocks for every 128 bits (step S101). It is assumed that the authentication target message 1000 is segmented into m blocks, and each segmented block is represented by $X_i$ (i=1, . . . , m).

Figure 5:
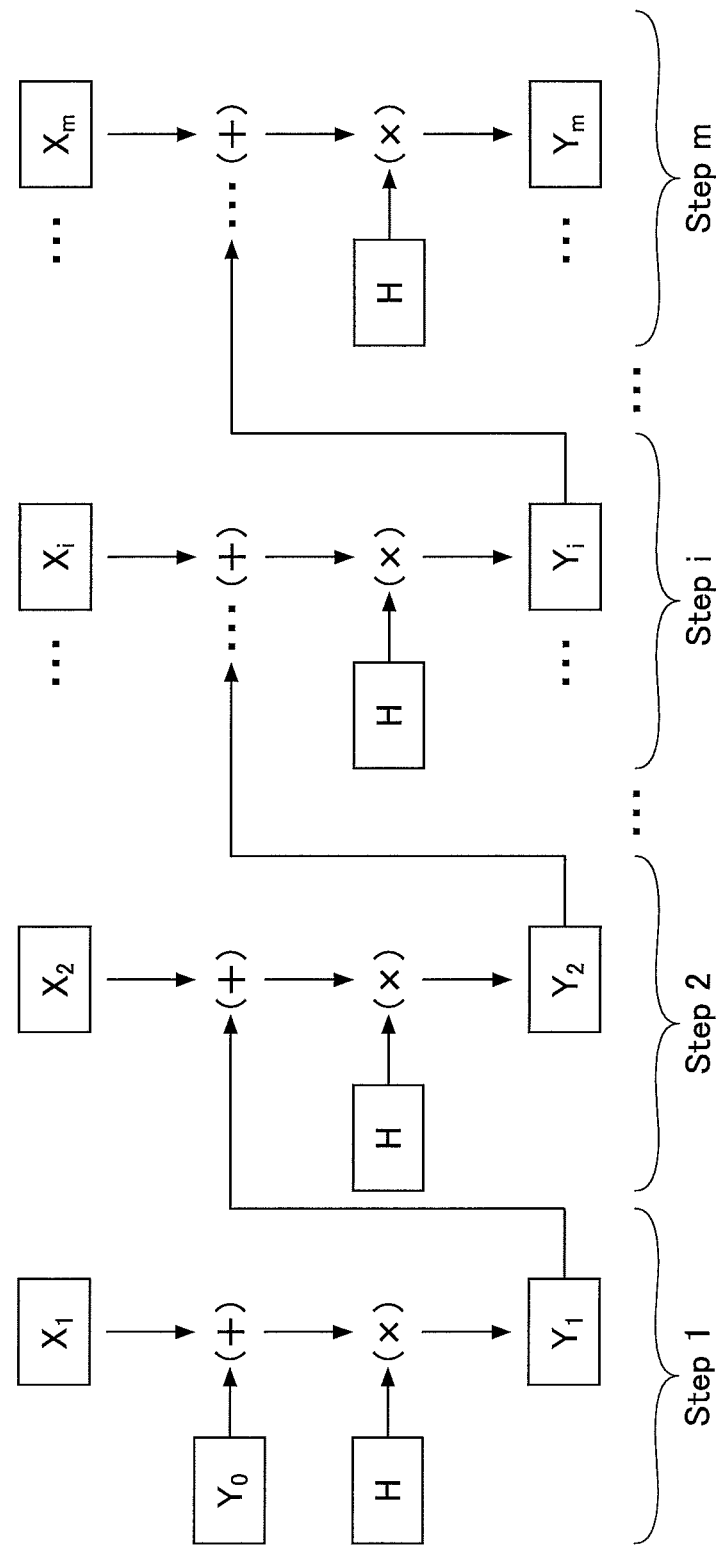
FIG. 5 is a diagram for explaining an outline of an example of a computing process of a GHASH function.

Next, the hash computation part 130 inputs the authentication target message 1000 segmented by the segmentation part 120, and performs a computing process of the GHASH function (step S102). A description will be given of an outline of a computing process of the GHASH function performed by the hash computation part 130, by referring to FIG. 5. FIG. 5 is a diagram for explaining the outline of an example of the computing process of the GHASH function.

In FIG. 5, $X_1, X_2, \ldots, X_m$ represent each of the blocks of the authentication target message 1000 segmented by the segmentation part 120. In addition, $Y_0$ represents a 128-bit bit string in which each bit component is 0. Further, H represents an encrypted bit string (this bit string is a 128-bit bit string) that is obtained by encrypting the 128-bit bit string in which each bit component is 0, using the AES encryption function. This H is a sub-key of the GHASH function. In this state, the hash computation part 130 inputs $X_1, X_2, \ldots, X_m$, and performs the following computing process of the GHASH function.

Step 1) The hash computation part 130 computes an exclusive-OR (+) of $X_1$ and $Y_0$ for every bit. Next, the hash computation part 130 computes a multiplication (x) of the computation result $X_1(+)Y_0$ and H. A multiplication operator (x) is a multiplication operator on a Galois field $GF(2^{128})$. In other words, the hash computation part 130 computes $Y_1 = (X_1(+)Y_0)(x)H$ in Step 1.

With respect to elements X and Y of the Galois field $GF(2^{128})$, a computation result $2_{128}$ of a computation X(x)Y by the multiplication operator (x) on the Galois field $GF(2^{128})$ can be obtained by successively computing the formulas defined below for i=0, . . . , 127, where $b_i$ represents an ith bit from a most significant bit (MSB) of X, and LSB represents a least significant bit. That is, it is assumed that X is represented by $X = b_0 b_1 \ldots b_{127}$ using a bit string $b_0 b_1 \ldots b_{127}$.

$$Z_{i+1} = \begin{cases} Z_i & (\text{if } b_i \text{ is } 0) \\ Z_i(+)V_i & (\text{if } b_i \text{ is } 1) \end{cases}$$

$$V_{i+1} = \begin{cases} V_i >> 1 & (\text{if } LSB \text{ of } V_i \text{ is } 0) \\ (V_i >> 1)(+)R & (\text{if } LSB \text{ of } V_i \text{ is } 1) \end{cases}$$

$Z_0$ is a 128-bit bit string in which each bit component is 0. In addition, $V_0$ is Y, and ">>" indicates a shift operator that shifts the bit string to the right. Further, R is a bit string in which upper 8 bits are represented by bit components "11100001", and bit components of lower 120 bits are all 0. In other words, R is a bit string corresponding to an irreducible polynomial $x^{127} + x^{126} + x^{125} + x^{120}$ of the Galois field $GF(2^{128})$.

Step 2) The hash computation part 130 computes the exclusive-OR (+) of $X_2$ and $Y_1$ for every bit. Next, the hash computation part 130 computes a multiplication (x) of the computation result $X_2(+)Y_1$ and H. In other words, the hash computation part 130 computes $Y_2 = (X_2(+)Y_1)(x)H$ in Step 2.

The hash computation part 130 performs the process described above with respect to all of the blocks $X_1, X_2, \ldots, X_m$. In other words, the hash computation part 130 computes $Y_i = (Y_{i-1}(+)X_i)(x)H$ with respect to i=1, . . . , m. A bit string $Y_m$ that is finally obtained is the hash value of the GHASH function. The outline is described above for the computing process of the GHASH function, and a more detailed description will be given later.

A description will be given by returning to FIG. 4. The encryption part 110 encrypts the hash value $Y_m$ using the GCTR function based on the given secret key K given in advance and the initial vector IV (step S103). The GCTR function that is used by the encryption part 110 in this state uses the secret key K similar to that of the GCTR function used when generating the ciphertext C by encrypting the plaintext information P (however, an initial counter block (ICB) is different).

Next, the authentication tag generation part 140 generates the authentication tag T by extracting predetermined upper t bits from the information that is encrypted in step S103 (Step S104). Here, t is a predetermined value greater than or equal to 1 and less than or equal to 128.

By the process described above, the information processing apparatus 10 in this embodiment obtains the hash value of the GHASH function by inputting the authentication target message 1000 including the authentication parameter A and the ciphertext C. After encrypting the hash value, the authentication tag T can be obtained by extracting a predetermined number of upper bits from the encrypted information. By obtaining the authentication tag T by a similar process performed at the decrypting end that decrypts the ciphertext C, the decrypting end can authenticate the completeness of the ciphertext C and the identity of the decrypting end.

<<Computing Process of GHASH Function>>

Figure 6:
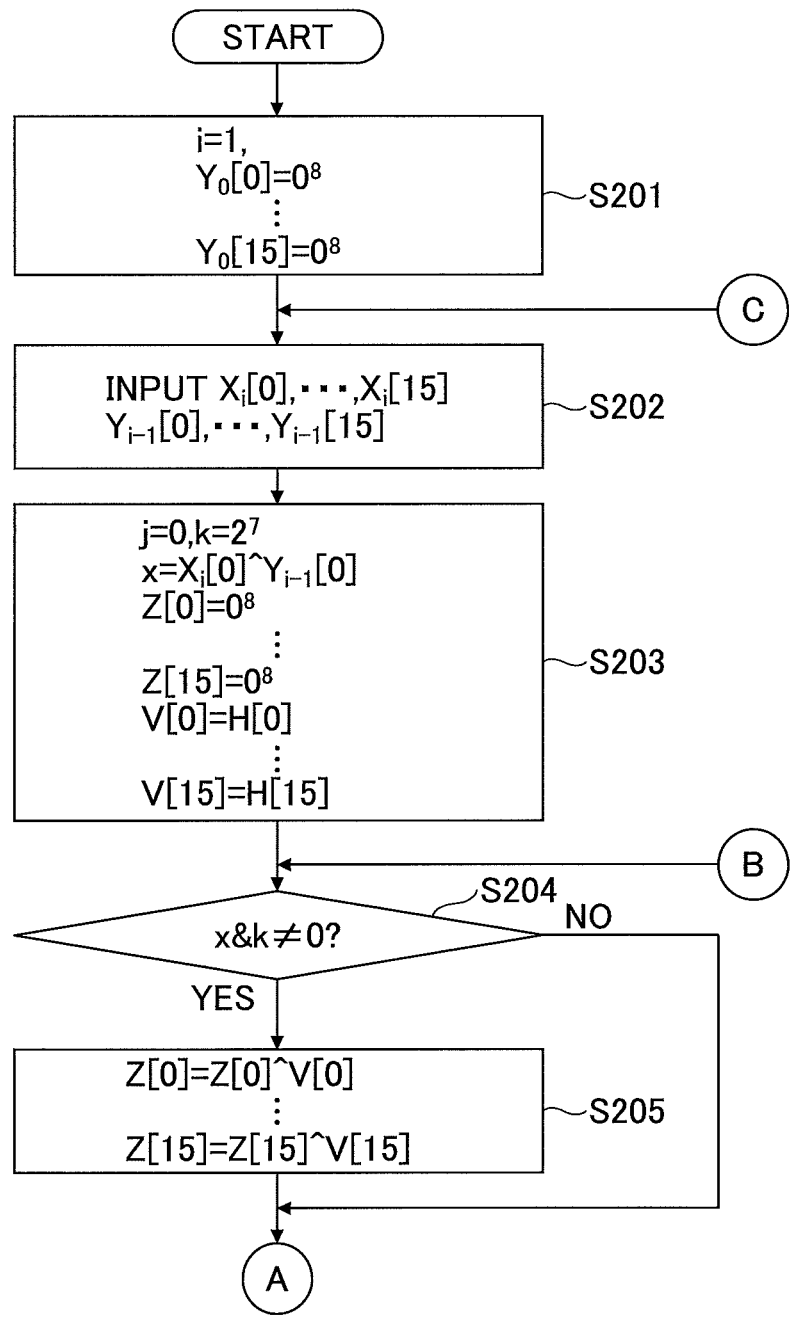
FIG. 6 is a flow chart (1/2) of an example of the computing process of the GHASH function in the first embodiment.
Figure 7:
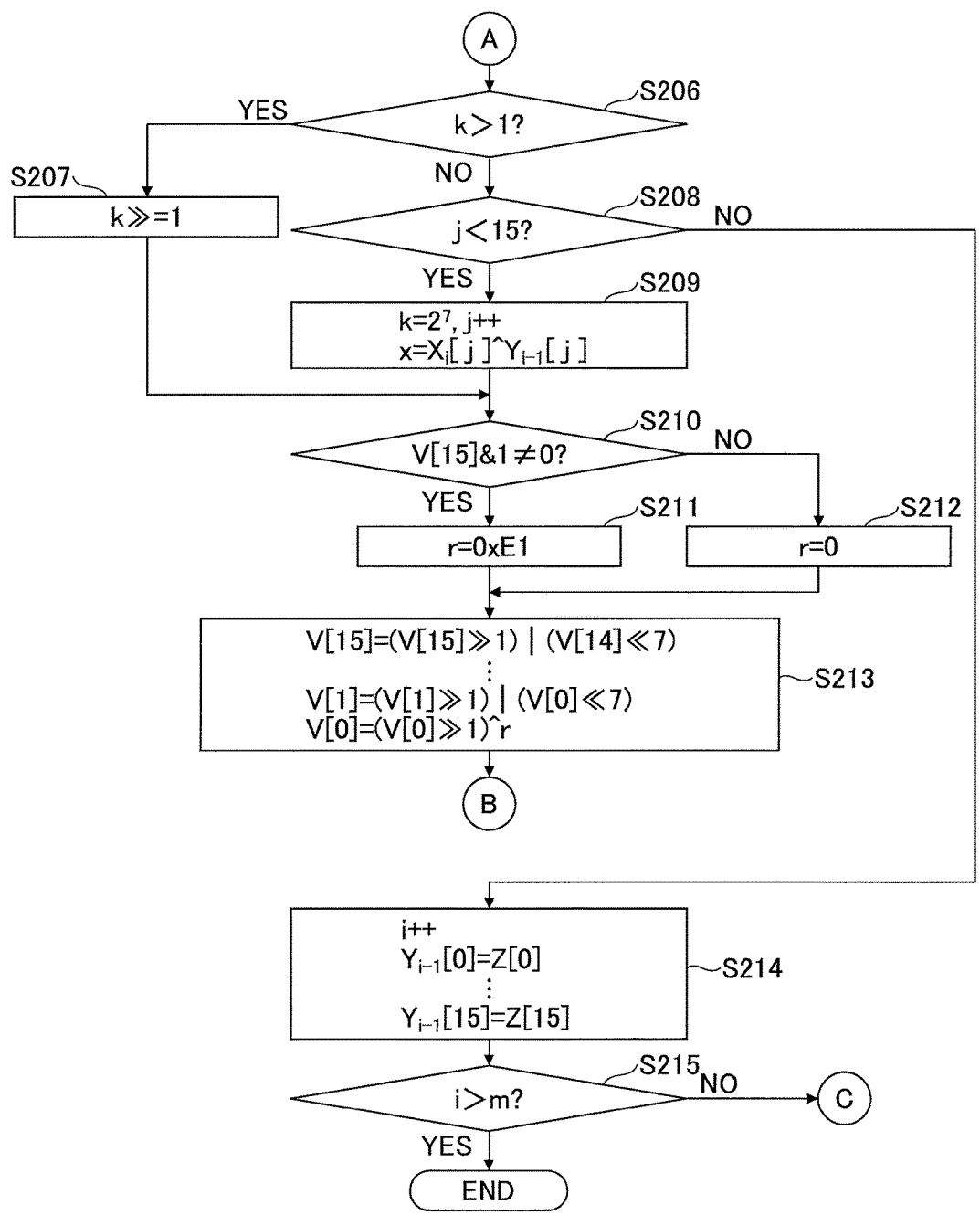
FIG. 7 is a flow chart (2/2) of the example of the computing process of the GHASH function in the first embodiment.

Next, a detailed description will be given of the computing process of the GHASH function in step S102 of FIG. 4, by referring to FIGS. 6 and 7.

In step S201, the hash computation part 130 prepares a variable i representing the ith block of the authentication target message 1000 that is segmented into m blocks, and initializes i to 1. In addition, the hash computation part 130 prepares an 8-bit array $Y_0[16]$ that is made up of 16 elements, and includes no sign, and initializes each element to 0. That is, the initialization initializes $Y_0[16]$ to $Y_0[0]$ =00000000, . . . , $Y_0[15]$=00000000. This array $Y_0[16]$ corresponds to the operand $Y_0$ used to compute the exclusive-OR with the first block $X_1$ in Step 1 described above in the outline of the computing process of the GHASH function with reference to FIG. 5.

In step S202, the hash computation part 130 prepares an 8-bit array $X_i[16]$ that is made up of 16 elements for storing the ith block of the authentication target message 1000 that is segmented into m blocks, and includes no sign, and inputs the ith block to this array $X_i[16]$. Further, the hash computation part 130 inputs an 8-bit array $Y_{i-1}[16]$ that includes no sign, for storing an operand used to compute the exclusive-OR with the array $X_i[16]$. When i is 1, the array $Y_{i-1}[16]$ is the array $Y_0[16]$ initialized in step S201 described above. That is, in Step 1 described with reference to FIG. 5, a 128-bit block $X_1$ is stored in the array $X_i[16]$ and input, and a 128-bit block $Y_0$ is stored in the array $Y_0[16]$ and input. Hence, in the computing process of the GHASH function of the information processing apparatus 10 in this embodiment, the 128-bit block is stored in the 8-bit array made up of 16 elements. As a result, the computing process of the GHASH function can be repeated for every 1 element of the array.

In step S203, the hash computation part 130 initializes various local variables and arrays. More particularly, the hash computation part 130 performs the following:

A variable j representing jth elements of the array $X_i[16]$ and the array $Y_{i-1}[16]$ is prepared, and j is initialized to 0.

A variable k used for judging whether a specific bit is 1 is prepared, and k is initialized to $2^7$.

An 8-bit variable x that stores the computation result of the exclusive-OR for every bit of the jth elements of the array $X_i[16]$ and the array $Y_{i-1}[16]$, and includes no sign, is prepared, and the computation result of the exclusive-OR for every bit of $X_i[0]$ and $Y_{i-1}[0]$ is substituted into x. That is, x=$X_i[0]$^$Y_{i-1}[0]$ is obtained, where an operator "^" is the operator (+) representing the exclusive-OR for every bit. In the following, the operator representing the exclusive-OR for every bit is indicated by "^".

An 8-bit array Z[16] made up of 16 elements for storing the GHASH function computation result, and includes no sign, is prepared, and each element is initialized to 0. That is, the initialization initializes Z[16] to Z[0]=00000000, . . . , Z[15]=00000000. Such an initialization can be performed as memset (Z, 0, 16) using a memset function of the C language.

An 8-bit array V[16] for performing a multiplication computation (x) on a Galois field, and including no sign, is prepared, and a sub-key H of the GHASH function is stored. For example, in a case in which the sub-key H is stored in an 8-bit array H[16] made up of 16 elements, and includes no sign, memcpy (V, H, 16) can be performed using a memcpy function of the C language.

In step S204, the hash computation part 130 judges whether a logical product computation result for every bit of x and k is 0. An operator "&" is the operator representing the logical product for every bit. For example, in a case in which k is 128 ($2^7$), judging whether x&k is 0 is equivalent to judging whether the most significant bit of x is 0. Similarly, in the process to be described later, in a case in which the value of k becomes 64 ($2^6$) as a result of shifting k to the right by 1 bit, judging whether x&k is 0 is equivalent to judging whether a bit lower by 1 bit from the most significant bit of x (second bit from left) is 0. In other words, when $b_0 b_1 \ldots b_7$ is represented as an 8-bit bit string x=$b_0 b_1 \ldots b_7$, the hash computation part 130 repeatedly judges whether the corresponding bit is 0, in a sequence from the most significant bit $b_0$ to the least significant bit $b_7$ of the bit string x. In a case in which the computation result of x&k is not 0, the hash computation part 130 advances the process to step S205. On the other hand, in a case in which the computation result of x&k is 0, the hash computation part 130 advances the process to step S206.

In step S205, the hash computation part 130 computes the exclusive-OR for every bit of each of the elements of the array Z[16] and the array V[16], and substitutes the computation results into the array Z[16]. More particularly, the hash computation part 130 performs the following process:

An exclusive OR is computed for every bit of Z[0] and V[0], and the computation result is substituted into Z[0]. That is, Z[0]=Z[0]^V[0] is computed.

An exclusive OR is computed for every bit of Z[1] and V[1], and the computation result is substituted into Z[1]. That is, Z[1]=Z[1]^V[1] is computed.

. . .

An exclusive OR is computed for every bit of Z[15] and V[15], and the computation result is substituted into Z[15]. That is, Z[15]=Z[15]^V[15] is computed.

Accordingly, the hash computation part 30 performs the substitution process to the array, without using an iterative process of a for statement or the like of the C language, for example. For this reason, compared to a case in which the iterative process of the for statement or the like is performed, it is possible to increase the computing speed of the GHASH function.

Generally, in a case in which the iterative process of the for statement or the like is used, a counter is incremented after performing a process described within the for statement, and a judgment is performed to determine whether to repeat the process by returning to a beginning of the for statement. Accordingly, in the information processing apparatus 10 in this embodiment, which is the embedded system having a relatively slow computing speed compared to that of the general-purpose computer system, the effect of reducing the computing time becomes more notable by describing the process without using the iterative process.

In step S206, the hash computation part 130 judges whether k is greater than 1. In a case in which k is greater than 1, the hash computation part 130 advances the process to step S207. On the other hand, in a case in which k is less than or equal to 1 (that is, k is 1), the hash computation part 130 advances the process to step S208.

In step S207, the hash computation part 130 performs a shift operation to shift k to the right by 1 bit, and substitutes a result of the shift operation into k. That is, k is set to k>>=1. Hence, in the process of step S204 described above, the hash computation part 130 can judge whether the bit string of x is 1, in a sequence starting from the most significant bit. An operator ">>=" is a compound assignment operator for substituting the result of the right-shift operation.

In step S208, the hash computation part 130 judges whether j is smaller than 15. In a case in which j is smaller than 15, the hash computation part 130 advances the process to step S209. On the other hand, in a case in which j is greater than or equal to 15 (that is, j is 15), the hash computation part 130 advances the process to step S214. The case in which j is 15 corresponds to a case in which a computing process of one segmented block $X_i$ of the authentication target message 1000 is completed. Accordingly, in the process of steps S214 through S215 described later, the hash value is output when i in this case is equal to m (that is, in the case in which the computing process of the last block of the authentication target message 1000 is completed). On the other hand, in a case in which i is smaller than m, the computing process of the next block of the authentication target message 1000 is performed.

In step S209, the hash computation part 130 performs the following substitution process:

$2^7$ is substituted into k.

A result of adding 1 to the value of j is substituted into j. In other words, the value of j is incremented.

A computation result of the exclusive-OR of every bit of $X_i[j]$ and $Y_{i-1}[j]$ is substituted into x. That is, x is set to $x=X_i[j]\hat{}Y_{i-1}[j]$.

Accordingly, the computing process can be performed by the GHASH function of the next element, for the array $X_i[16]$ and the array $Y_{i-1}[16]$.

In step S210, the hash computation part 130 judges whether a logical product computation result for every bit of V[15] and 1 is 0. That is, the hash computation part 130 judges whether the least significant bit of V[15] is 0. In other words, when bit strings stored in V[0] through V[15] are arranged in a sequence from the left and referred to as a bit string V, this step is equivalent to the hash computation part 130 judging whether the least significant bit of this bit string V is 0. The hash computation part 130 advances the process to step S211 in a case in which the logical product computation result for every bit of V[15] and 1 is not 0 (that is, in the case in which the computation result is 1), and advances the process to step S212 in a case in which the computation result is 0.

In step S211, the hash computation part 130 substitutes a hexadecimal value "0xE1" into an 8-bit variable r that includes no sign. In other words, the hash computation part 130 substitutes a bit string "11100001" into r. This corresponds to the upper 8 bits of the bit string corresponding to the irreducible polynomial $x^{127}+x^{126}+x^{125}+x^{120}$ of the Galois field $GF(2^{128})$.

In step S212, the hash computation part 130 substitutes 0 into the 8-bit variable r that includes no sign.

In step S213, the hash computation part 130 performs the following computing process and the substitution process with respect to the array V[16]:

A logical sum is computed for every bit of a computation result obtained by shifting V[16] to the right by 1 bit and a computation result obtained by shifting V[14] to the left by 7 bits, and the computed logical sum is substituted into V[15]. That is, V[15]=(V[15]>>1)|(V[14]<<7) is performed, where ">>" indicates a shift operator that shifts the bit to the right, "<<" indicates a shift operator that shifts the bit to the left, and "|" indicates a logical sum operator for every bit.

A logical sum is computed for every bit of a computation result obtained by shifting V[14] to the right by 1 bit and a computation result obtained by shifting V[13] to the left by 7 bits, and the computed logical sum is substituted into V[14]. That is, V[14]=(V[14]>>1)|(V[13]<<7) is performed.

. . .

A logical sum is computed for every bit of a computation result obtained by shifting V[1] to the right by 1 bit and a computation result obtained by shifting V[0] to the left by 7 bits, and the computed logical sum is substituted into V[1]. That is, V[1]=(V[1]>>1)|(V[0]<<7) is performed.

A logical sum is computed for every bit of a computation result obtained by shifting V[0] to the right by 1 bit and r, and the computed logical sum is substituted into V[0]. That is, V[0]=(V[0]>>1)^r is performed.

When bit strings stored in V[0] through V[15] are arranged in a sequence from the left and referred to as a bit string V, the process of step S213 described above is equivalent to performing a bit shift operation to shift the bit string V to the right by 1 bit, and computing the exclusive-OR of 8 upper bits of the result of the bit shift operation and r. In addition, in a case in which r is 0, the computation result of the exclusive-OR is equivalent to the result of the bit shift operation that shifts the bit string V to the right by 1 bit. In other words, (V>>1)^r=(V>>1).

The hash computation part 130 also performs the process of step S213 described above without using an iterative process of a for statement or the like of the C language, for example, similarly to the case of the process of step S205. For this reason, compared to a case in which the iterative process of the for statement or the like is performed, it is possible to increase the computing speed of the CRASH function.

After the process of step S213 described above, the hash computation part 130 returns the process to step S204. Hence, the hash computation part 130 computes the GHASH function of a bit $b_{l+1}$ next to a certain bit $b_l$ of $x=b_0b_1 \ldots b_7$ that is presently being target (however, 1<7). In a case in which 1=7, the GHASH operation is performed with respect to the most significant bit of the computation result that is obtained by computing the exclusive-OR for every bit of the next elements of the array $X_i[j]$ and the array $Y_{i-1}[j]$ (however, j<15).

In step S214, the hash computation part 130 performs the following substitution process:

A result of adding 1 to the value of i is substituted into i. In other words, the value of i is incremented.

Z[0] is substituted into $Y_{i-1}[0]$. That is, $Y_{i-1}[0]$ is set to $Y_{i-1}[0]=Z[0]$.

Z[1] is substituted into $Y_{i-1}[1]$. That is, $Y_{i-1}[1]$ is set to $Y_{i-1}[1]=Z[1]$.

. . .

Z[15] is substituted into $Y_{i-1}[15]$. That is, $Y_{i-1}[15]$ is set to $Y_{i-1}[15]=Z[15]$.

In step S215, the hash computation part 130 judges whether the value of i is greater than m. In a case in which the value of i is greater than m (that is, in the case in which i is m+1), the hash computation part 130 ends the process. In this state, the hash computation part 130 outputs the array $Y_{i-1}[16]$ (that is, the array $Y_m[16]$), as the hash value. On the other hand, in a case in which the value of i is less than or equal to m, the hash computation part 130 returns the process to step S202. That is, in step S202, the hash computation part 130 performs the computing process of the GHASH function, based on the array $X_i[16]$ to which the next block $X_i$ of the authentication target message 1000 is substituted, and the array $Y_{i-1}[16]$ obtained in step S214, which are obtained as inputs.

The computing process of the GHASH function described above in conjunction with FIGS. 6 and 7 may be performed in parallel to the process of encrypting the plaintext message P by AES-GCM (or decrypting the ciphertext). In other words, the computing process of the GHASH function can be performed in processes of 128 bits, even when not all of the authentication target message 1000 has been received (for example, even when the ciphertext C is being created), as long as data amounting to at least 128 bits are included in the authentication target message 1000. The same holds true for the computing process of the GHASH function which will be described later.

Accordingly, in the information processing apparatus 10 in this embodiment, the computing process of the GHASH function is performed without using an iterative process in the computing process with respect to each element of the array, or in the substitution process. Hence, incrementing the variable associated with the iterative process, a jump process, and a judging process may be omitted to efficiently utilize the hardware resources, and increase the speed of the process. Such features may be useful particularly in the embedded device implemented with the MPU 11 or the like that is relatively inexpensive compared to the general-purpose computer system, due to cost restraints, as in the case of the information processing apparatus 10 in this embodiment. The GHASH function of the information processing apparatus 10 in this embodiment treats the substitution process to the element of the array as a consecutive process (sequential process) without using the iterative process. For this reason, although the capacity of the program slightly increases, the speed of the computing process of the GHASH function can be increased to approximately 2 times to approximately 4 times when compared to that of the general-purpose computer system, for a case in which specifications of the MPU 11 of the information processing apparatus 10 in this embodiment are the same as those of the MPU in the general-purpose computer system.

Second Embodiment

Next, a description will be given of the information processing apparatus 10 in a second embodiment. In this embodiment, the computing process of the GHASH function differs from that of the first embodiment, in that the array V[16] is not shifted 1 bit at a time, but is shifted in units of required number of bits in one shift operation. In addition, an r (bit string corresponding to irreducible polynomial of the Galois field $GF(2^{128})$) conversion table is used when the array V[16] is shifted in units of a plurality of bits.

<Functional Configuration>

Figure 8:
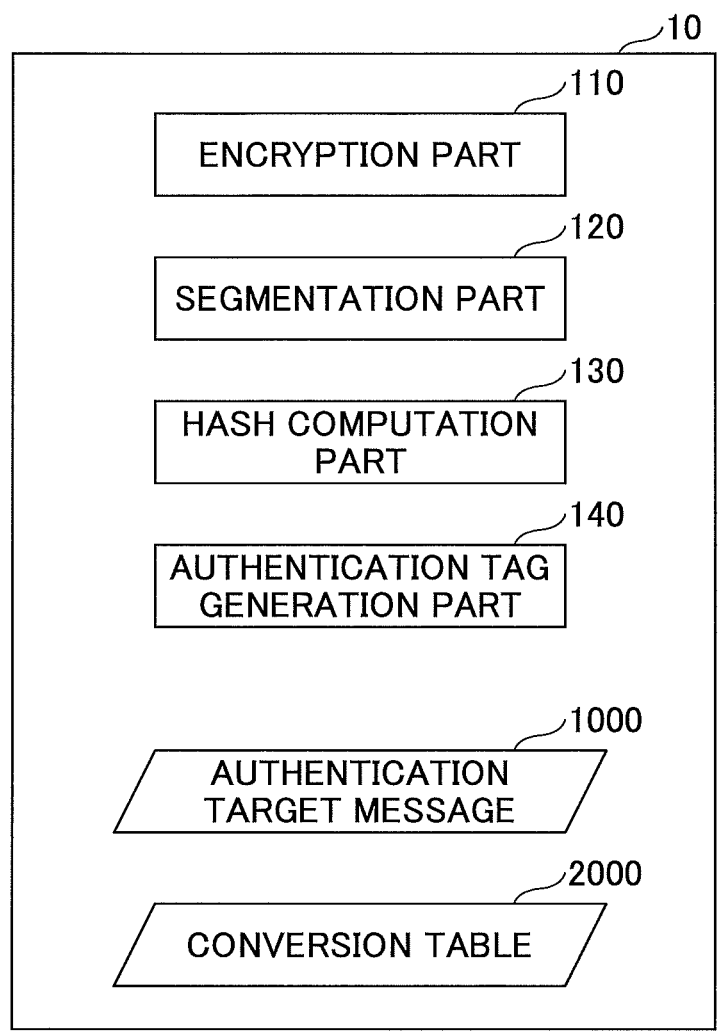
FIG. 8 is a functional configuration diagram of an example of the information processing apparatus in a second embodiment.

Next, a description will be given of the functional configuration of the information processing apparatus 10 in this embodiment. FIG. 8 is a functional configuration diagram of an example of the information processing apparatus in the second embodiment. The functional configuration of the information processing apparatus 10 in this embodiment differs from that of the information processing apparatus 10 in the first embodiment, in that a conversion table 2000 is provided in the second embodiment.

The conversion table 2000 has a data configuration illustrated in FIG. 9. In FIG. 9, the conversion table 2000 is defined by a 16-bit array Rmap[256] made up of 256 elements and including no sign. This conversion table 2000 is used to convert the value of r into a corresponding element of the conversion table 2000, according to the number of bits the array V[16] is to be shifted by the computing process of the GHASH function.

<Details of Process>

Next, a description will be given of details of the process of the information processing apparatus 10 in this embodiment. In the information processing apparatus 10 in this embodiment, the computing process of the GHASH function is different from that of the first embodiment.

<<Computing Process of GHASH Function>>

Figure 10:
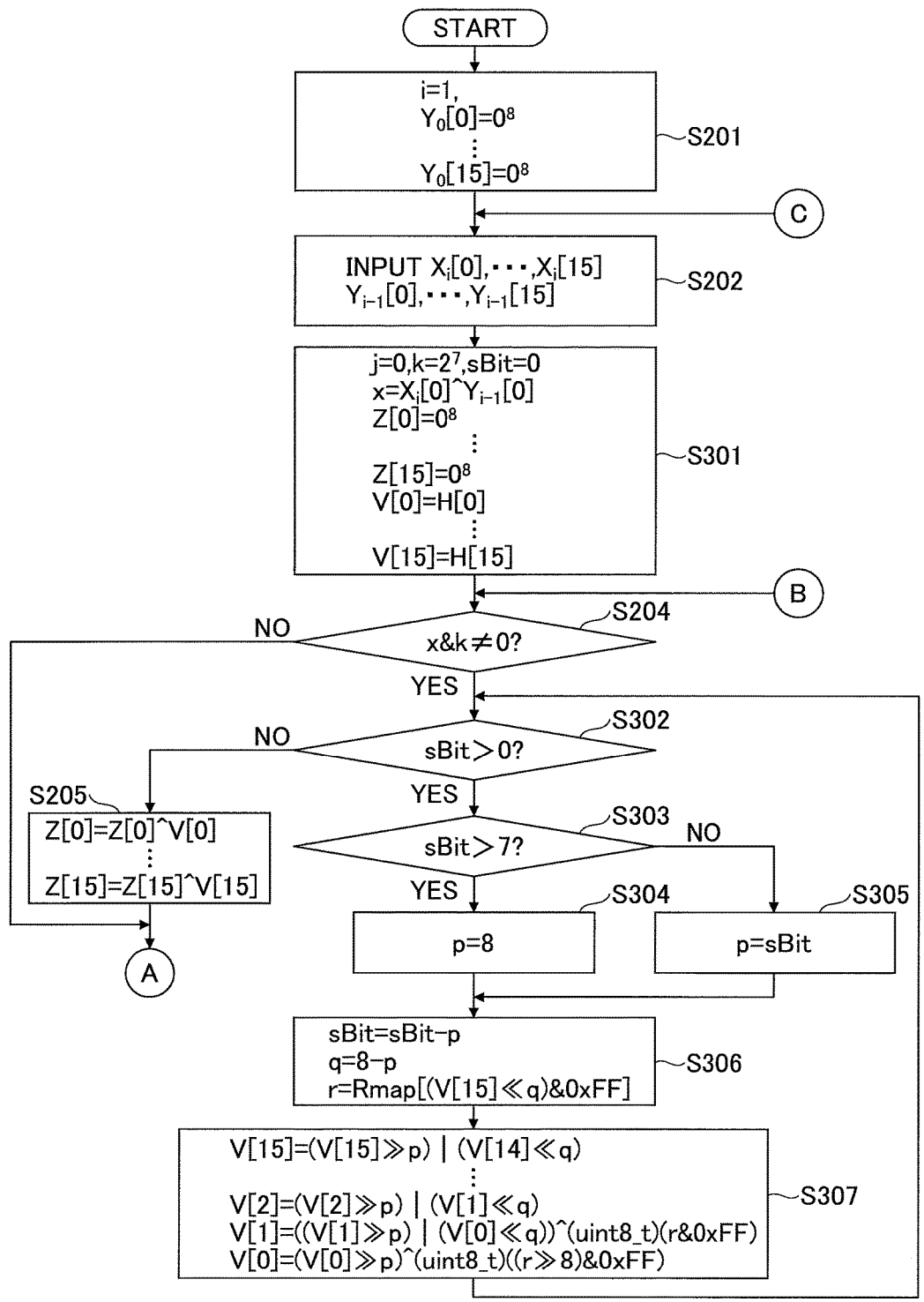
FIG. 10 is a flow chart (1/2) of an example of the computing process of the GHASH function in the second embodiment.
Figure 11:
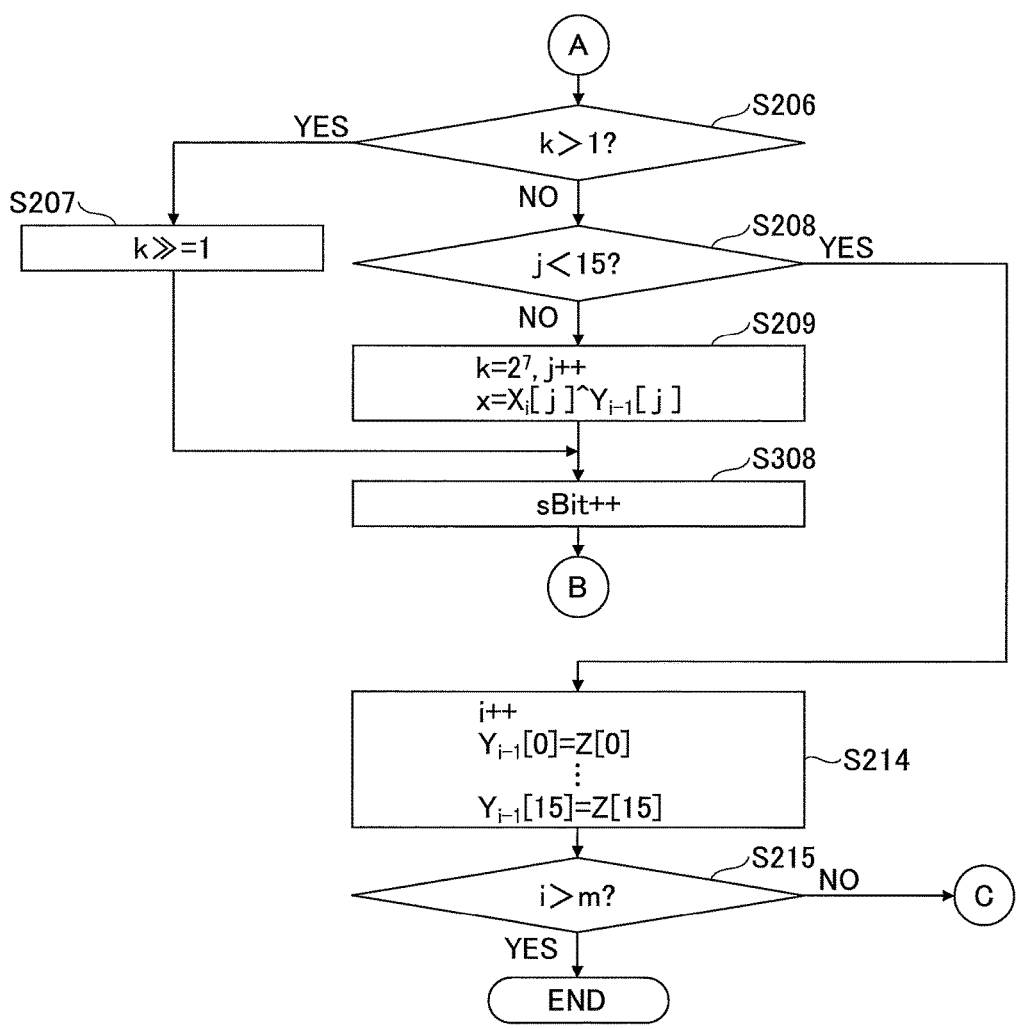
FIG. 11 is a flow chart (2/2) of the example of the computing process of the GHASH function in the second embodiment.

A detailed description will be given of the computing process of the GHASH function in this embodiment, in step S102 illustrated in FIG. 4 described above, by referring to FIGS. 10 and 11. In this embodiment, processes of steps S301 through S308 differ from the computing process (FIGS. 6 and 7) of the GHASH function performed by the information processing apparatus 10 in the first embodiment described above. Hence, in the following, a description will be given of the processes of steps S301 through S308.

In step S301, the hash computation part 130 initializes various local variables and arrays. More particularly, the hash computation part 130 performs the following process in addition to the process of step S203 illustrated in FIG. 6 of the first embodiment:

A variable sBit for counting a number of shifts for performing a shift operation on the array V[16] is prepared, and sBit is initialized to 0.

In step S302, the hash computation part 130 judges whether sBit is greater than 0. That is, the hash computation part 130 judges whether the shift operation is required for the array V[16]. The hash computation part 130 advances the process to step S303 in a case in which sBit is greater than 0 (that is, in the case in which the shift operation is required). On the other hand, the hash computation part 130 advances the process to step S205 in a case in which sBit is 0 (that is, in the case in which no shift operation is required).

In step S303, the hash computation part 130 judges whether sBit is greater than 7. This judgement is performed in order to perform the shift operation on the array V[16] in a unit of 8 bits or less. Accordingly, in a case in which the value of sBit is 10, the hash computation part 130 performs an 8-bit the shift operation and a 2-bit shift operation with respect to the array V[16].

In step S304, the hash computation part 130 substitutes 8, as a number of bits, p, for shifting the array V[16] to the right.

In step S305, the hash computation part 130 substitutes the value of sBit, as the number of bits, p, for shifting the array V[16] to the right.

In step S306, the hash computation part 130 performs the following process:

A result obtained by subtracting p from sBit is substituted into sBit. That is, sBit is set to sBit=sBit-p.

8-p is substituted into a number of bits, q, for shifting the array V[16] to the left. That is, q is set to q=8-p.

With respect to r for computing the exclusive-OR for every bit of the 16 most significant bits of the array V[16] (that is, the bit strings stored in each of V[0] and V[1]), a corresponding value is substituted using the conversion table 2000. More particularly, r is set to r=Rmap[(V[15]<<q) &0xFF].

For example, in a case in which p=1, 1 candidate of the computation result of (V[15]<<q) is 128, because q=7. Accordingly, in this state, r becomes r=Rmap[128]=0xE100. This corresponds to the upper 16 bits of the bit string corresponding to the irreducible polynomial of the Galois field $GF(2^{128})$. Another candidate of the computation result of (V[15]<<q) for a case in which p=1 is 0. In this case, r becomes r=Rmap[0]=0x0000.

Similarly, because q=6 in a case in which p=2, 1 candidate of the computation result of (V[15]<<q) is 192. Accordingly, in this state, r becomes r=Rmap[192]=0x9180. This matches a computation result of computing an exclusive-OR of the upper 16 bits of the bit string corresponding to the irreducible polynomial of the Galois field $GF(2^{128})$, and a bit string obtained by shifting the bit string corresponding to the irreducible polynomial of the Galois field $GF(2^{128})$ to the right by 1 bit. Other candidates of the computation result of (V[15]<<q) for a case in which p=2 are 0, 64, and 128. These candidates have lower 2 bits of V[15] that are 00, 01, and 10.

The computation may be performed by a similar method, when p is 3 or greater. Hence, the conversion table 2000 defines the value of r corresponding to the number of bits of the array V[16] to be shifted.

In step S307, the hash computation part 130 performs the following computing process and the substitution process with respect to the array V[16]:

A logical sum is computed for every bit of the computation result of shifting V[15] to the right by p bits and the computation result of shifting V[14] to the left by q bits, and the computed result of the logical sum is substituted into V[15]. That is, V[15] is set to V[15]=(V[15]>>p)|(V[14]<<q).

. . .

A logical sum is computed for every bit of the computation result of shifting V[2] to the right by p bits and the computation result of shifting V[1] to the left by q bits, and the computed result of the logical sum is substituted into V[2]. That is, V[2] is set to V[2]=(V[2]>>p)|(V[1]<<q).

A logical sum is computed for every bit of the computation result of shifting V[1] to the right by p bits and the computation result of shifting V[0] to the left by q bits. In addition, a result of computing the exclusive-OR of the logical sum and the lower 8 bits of r is substituted into V[1]. That is, V[1] is set to V[1]=(V[15]>>p)|(V[0]<<q)^ (uint8_t) (r&0xFF), where "(uint8_t)" is a cast operator for converting the type of r&0xFF into 8 bits including no sign.

A logical sum is computed for every bit of the computation result of shifting V[0] to the right by p bits and the upper 8 bits of r, and a result of computing the logical sum is substituted into V[0]. That is, V[0] is set to V[0]= (V[0]>>p)^(uint8_t) ((r>>8)&0xFF)).

After the process of step S306 described above, the hash computation part 130 returns the process to step S302. Accordingly, in a case in which the value of sBit is 1 or greater, the hash computation part 130 again performs the processes of steps S303 through S307. Hence, in the computing process of the GHASH function in the information processing apparatus 10 in this embodiment, the shift operation on the array V[16] can be performed in units of a plurality of bits. For this reason, compared to repeating a shift operation of 1 bit on the array V[16], it is possible to perform the process at a high speed.

In step S308, the hash computation part 130 substitutes a result of adding 1 to the value of sBit into sBit. In other words, the hash computation part 130 increments the value of sBit. That is, the process of step S308 is performed, in place of the processes of steps S210 through S213 of FIG. 7 in the computing process of the GHASH function in the first embodiment. For this reason, the shift operation in units of the plurality of bits can be performed on the array V[16] in the process of step S307 described above.

Accordingly, in the information processing apparatus 10 in this embodiment, the shift operation on the array is performed in units of the plurality of bits, in the computing process of the GHASH function. In addition, the conversion table is used to convert r into a predetermined value, according to the number of bits of the shift operation. Hence, the number of shift operations can be reduced by performing the shift operation in units of the plurality of bits. Therefore, it is possible to perform the computing process of the GHASH function at a higher speed when compared to the computing process of the GHASH function performed by the information processing apparatus 10 in the first embodiment.

Third Embodiment

Next, a description will be given of the information processing apparatus 10 in a third embodiment. In this embodiment, in the computing process of the GHASH function, the shift operation on the array V[16] is formed by a process of shifting 2 bits and a process of shifting 1 bit. Hence, the information processing apparatus 10 in this embodiment does not include the conversion table 2000, and the computing process of the GHASH function can be performed at a higher speed when compared to the first embodiment. A functional configuration of the information processing apparatus 10 in this embodiment is similar to the functional configuration of the information processing apparatus 10 in the first embodiment.

<Evaluation of Process>

Next, a detailed description will be given of the process of the information processing apparatus 10 in this embodiment. In the information processing apparatus 10 in this embodiment, the computing process of the GHASH function differs from that of the second embodiment.

<<Computing Process of GHASH Function>>

Figure 12:
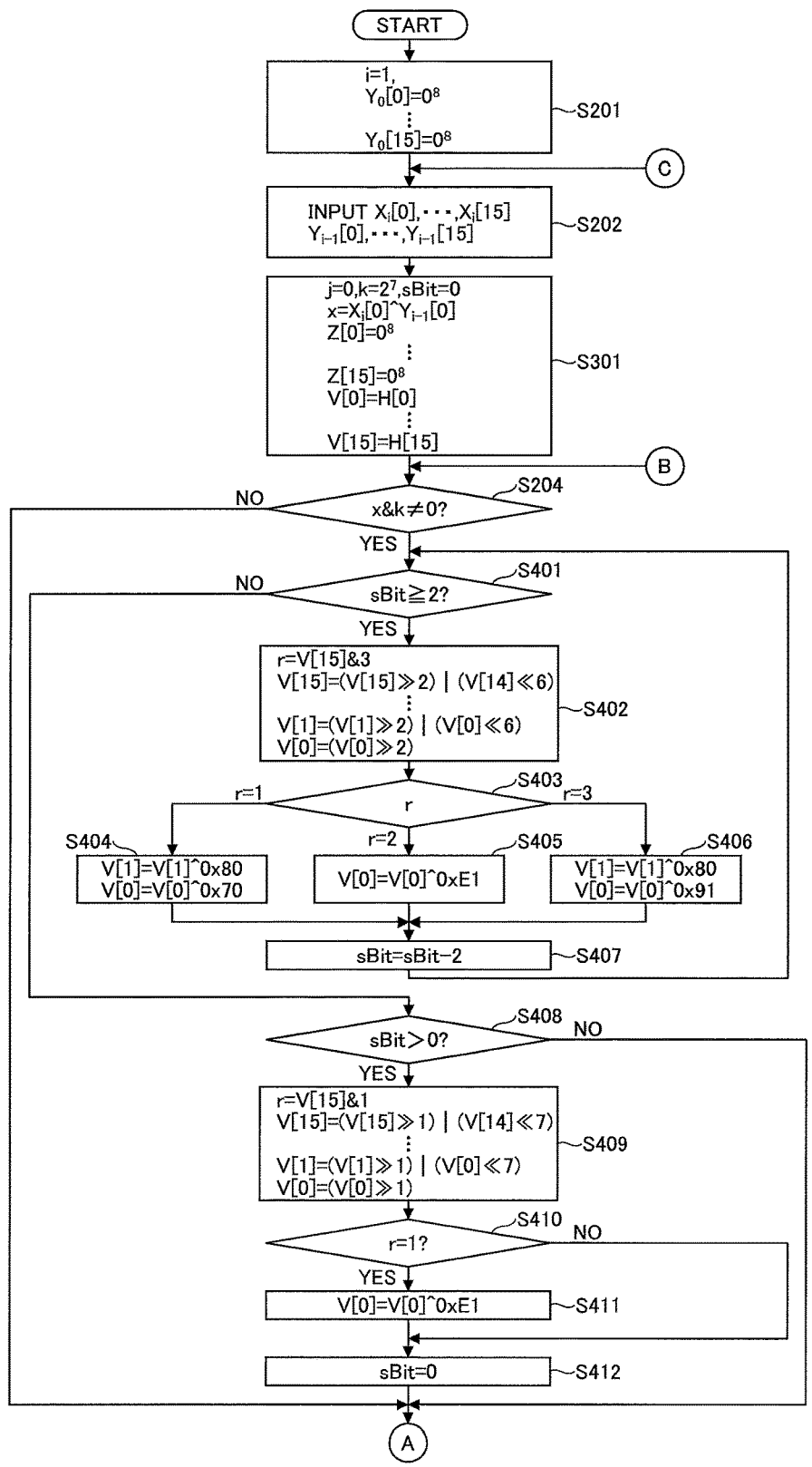
FIG. 12 is a flow chart (1/2) of an example of the computing process of the GHASH function in a third embodiment.
Figure 13:
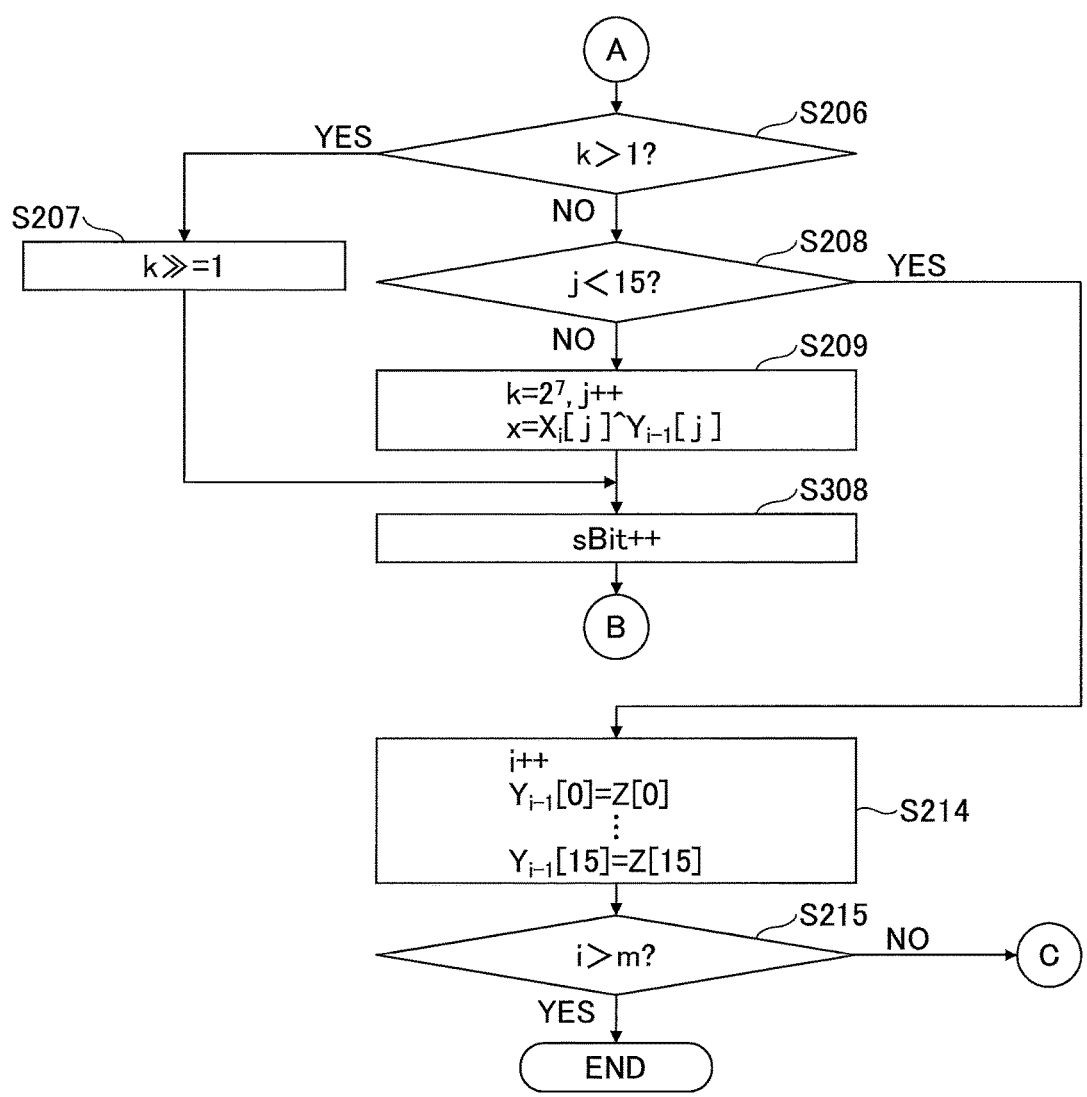
FIG. 13 is a flow chart (2/2) of the example of the computing process of the GHASH function in the third embodiment.

A description will be given of the computing process of the GHASH function in this embodiment at step S102 of FIG. 4 described above, by referring to FIGS. 12 and 13. In this embodiment, processes of steps S401 through S412 differ from the computing process (FIGS. 10 and 11) of the GHASH function performed by the information processing apparatus 10 in the second embodiment described above. Hence, in the following, a description will be given of the processes of steps S401 through S412.

In step S401, the hash computation part 130 judges whether sBit is greater than or equal to 2. Hence, in a case in which sBit is greater than or equal to 2, the processes of steps S402 through S407 described later are repeated, to perform the shift operation on the array V[16] 2 bits at a time. In the case in which sBit is greater than or equal to 2, the hash computation part 130 advances the process to step S402. On the other hand, the hash computation part 130 advances the process to step S408 in a case in which sBit is less than 2 (that is, in a case in which sBit is 0 or 1).

In step S402, the hash computation part 130 performs the following computing process and the substitution process with respect to the array V[16]:

A computation result of a logical product for every bit of V[15] and 3 is substituted into r. That is, r is set to r=V[15]&3. In other words, the value of the lower 2 bits of V[15] is substituted into r.

A logical sum is computed for every bit of a computation result of shifting V[15] to the right by 2 bits and a computation result of shifting V[14] to the left by 6 bits, and the logical sum is substituted into V[15]. That is, V[15] is set to V[15]=(V[15]>>2)|(V[14]<<6).

. . .

A logical sum is computed for every bit of a computation result of shifting V[1] to the right by 2 bits and a computation result of shifting V[0] to the left by 6 bits, and the logical sum is substituted into V[1]. That is, V[1] is set to V[1]=(V[1]>>2)|(V[0]<<6).

A computation result of shifting V[0] to the right by 2 bits is substituted into V[0]. That is, V[0] is set to V[0]= (V[0]>>2).

In step S403, the hash computation part 130 judges whether the value of r is 1, 2, or 3. In a case in which the value of r is 1, the process advances to step S404. In a case in which the value of r is 2, the process advances to step S405. In a case in which the value of r is 3, the process advances to step S406.

In step S404, the hash computation part 130 performs the following computing process and the substitution process:

An exclusive-OR of V[1] and 0x80 is computed, and the computed result is substituted into V[1]. That is, V[1] is set to V[1]=V[1]^0x80.

An exclusive-OR of V[0] and 0x70 is computed, and the computed result is substituted into V[0]. That is, V[0] is set to V[0]=V[0]^0x70.

0x80 and 0x70 are lower 8 bits and upper 8 bits of the value R[64] in the conversion table 2000 of the second embodiment. Accordingly, in the computing process of the GHASH function in this embodiment, values corresponding to the values of the conversion table 2000 are used directly, without using the conversion table 2000. In other words, the GHASH function in this embodiment describes these corresponding values on a source code as the so-called magic numbers.

In step S405, the hash computation part 130 performs the following computing process and the substitution process:

An exclusive-OR of V[0] and 0xE1 is computed, and the computed result is substituted into V[0]. That is, V[0] is set to V[0]=V[0]^0xE1.

0xE1 is the upper 8 bits of the value R[128] in the conversion table 2000 of the second embodiment.

In step S406, the hash computation part 130 performs the following computing process and the substitution process:

An exclusive-OR of V[1] and 0x80 is computed, and the computed result is substituted into V[1]. That is, V[1] is set to V[1]=V[1]^0x80.

An exclusive-OR of V[0] and 0x91 is computed, and the computed result is substituted into V[0]. That is, V[0] is set to V[0]=V[0]^0x91.

0x80 and 0x91 are lower 8 bits and upper 8 bits of the value R[192] in the conversion table 2000 of the second embodiment.

In step S407, the hash computation part 130 substitutes a result of subtracting 2 from the value of sBit into sBit. Thereafter, the hash computation part 130 returns the process to step S401. That is, the hash computation part 130 performs the shift operation that shifts 2 bits at a time on the array V[16] in steps S402 through S406 described above, until the value of sBit becomes less than or equal to 1.

In step S408, the hash computation part 130 judges whether the value of sBit is greater than 0. That is, the hash computation part 130 judges whether the value of sBit is 1. In a case in which the value of sBit is greater than 0, the hash computation part 130 advances the process to step S409. On the other hand, the hash computation part 130 advances the process to step S206 in a case in which the value of sBit is less than or equal to 0 (that is, in a case in which the value of sBit is 0).

In step S409, the hash computation part 130 performs the following computing process and the substitution process with respect to the array V[16]:

A logical product for every bit of V[15] and 1 is computed, and the computed logical product is substituted into r. That is, r is set to r=V[15]&1. In other words, the value of the lower 1 bit of V[15] is substituted into r.

A logical sum for every bit of a result of shifting V[15] to the right by 1 bit and a result of shifting V[14] to the left by 7 bits, and the computed logical sum is substituted into V[15]. That is, V[15] is set to V[15]=(V[15]>>1)|(V[14]<<7).

. . .

A logical sum for every bit of a result of shifting V[1] to the right by 1 bit and a result of shifting V[0] to the left by 7 bits, and the computed logical sum is substituted into V[1]. That is, V[1] is set to V[1]=(V[1]>>1)|(V[0]<<7).

A result of shifting V[0] to the right by 1 bit is substituted into V[0]. That is, V[0] is set to V[0]=(V[0]>>1).

In step S410, the hash computation part 130 judges whether the value of r is 1. That is, the hash computation part 130 judges whether the least significant bit of V[15] is 1. In a case in which the value of r is 1, the hash computation part 130 advances the process to step S411. On the other hand, in a case in which the value of r is not 1, the hash computation part 130 advances the process to step S412.

In step S411, the hash computation part 130 performs the following computing process and the substitution process:

An exclusive-OR of V[0] and 0xE1 is computed, and the computed result is substituted into V[0]. That is, V[0] is set to V[0]=V[0]^0xE1.

In step S412, the hash computation part 130 substitutes 0 into sBit.

Accordingly, in the information processing apparatus in this embodiment, the computing process of the GHASH function combines the 2-bit shift operation and the 1-bit shift operation for the shift operation performed on the array. For example, in a case in which the array requires 5 bits to be shifted, the 2-bit shift operation is performed twice, and the 1-bit shift operation is performed once. Hence, the computing process of the GHASH function can be performed at a high speed, without providing the conversion table 2000 as in the case of the information processing apparatus 10 in the second embodiment.

The authentication target message 100 that is the input to the GHASH function includes the ciphertext C. Accordingly, it may be regarded that the probability of a bit component 1 consecutively appearing three or more times in the bit string of the authentication target message 1000 is low. Hence, the computing process of the GHASH function performed by the information processing apparatus 10 in this embodiment does not use the conversion table 2000, and the shift operation on the array is performed by a combination of the 2-bit shift operation and the 1-bit shift operation. For this reason, in the information processing apparatus 10 in this embodiment, it is possible to save the capacity of the ROM that would otherwise be required to store the conversion table 2000, and the computing process of the GHASH function can be performed at a higher speed compared to that performed by the information processing apparatus 10 in the first embodiment.

Fourth Embodiment

Next a description will be given of the information processing apparatus 10 in a fourth embodiment. In this embodiment, the computing process of the GHASH function uses a 16-bit array V[8] including no sign and an array Z[8], in place of using the 8-bit array V[16] including no sign and the array Z[16]. The functional configuration of the information processing apparatus 10 in this embodiment is similar to the functional configuration of the information processing apparatus 10 in the first embodiment.

<Details of Process>

Next, a description will be given of details of the process of the information processing apparatus 10 in this embodiment, by referring to the drawings. The computing process of the GHASH function in the information processing apparatus 10 in this embodiment differs from that of the first embodiment.

<<Computing Process of GHASH Function>>

Figure 14:
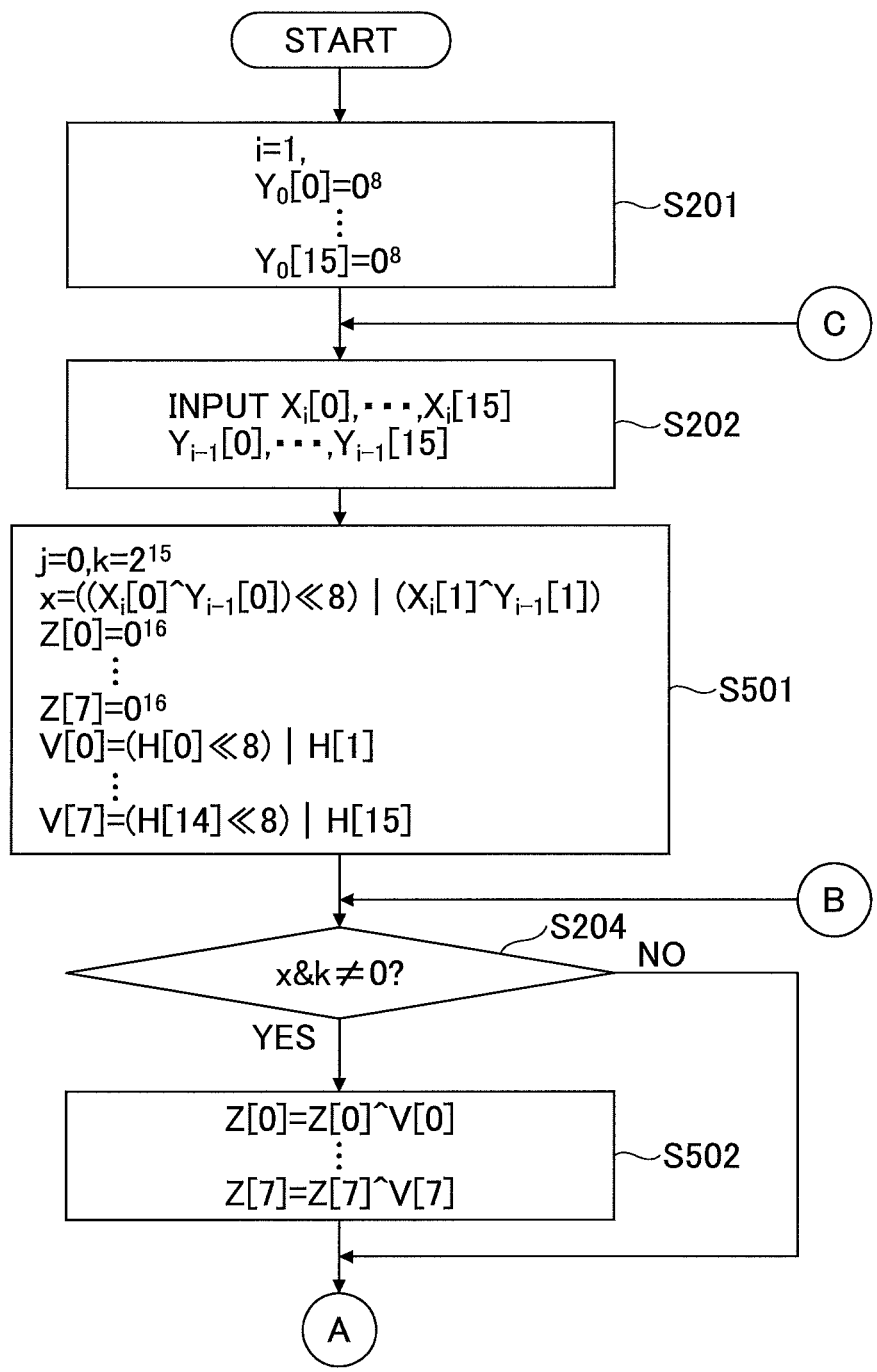
FIG. 14 is a flow chart (1/2) of an example of the computing process of the GHASH function in a fourth embodiment.
Figure 15:
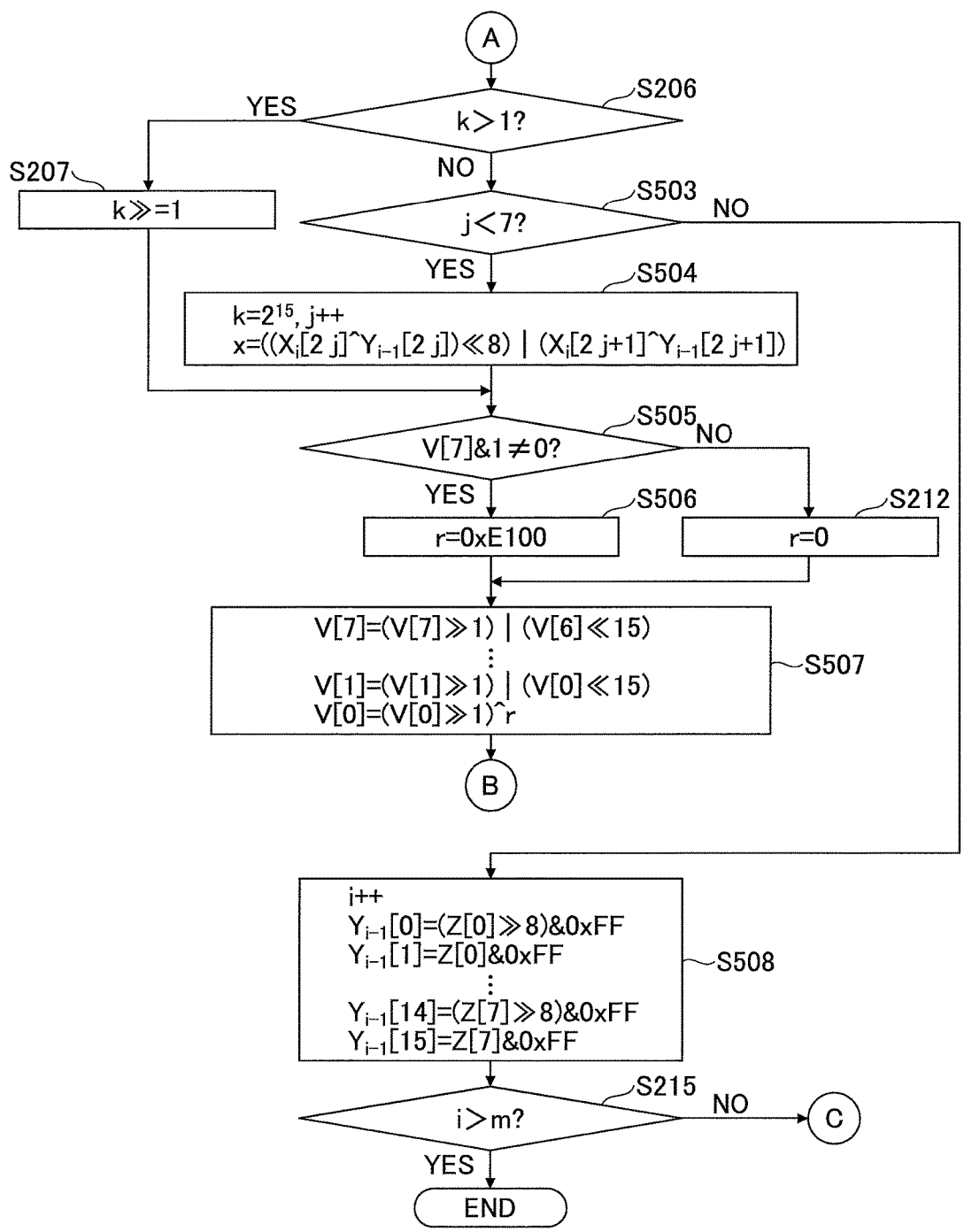
FIG. 15 is a flow chart (2/2) of the example of the computing process of the GHASH function in the fourth embodiment.

Next, a detailed description will be given of the computing process of the GHASH function in this embodiment, in step S102 illustrated in FIG. 4 described above, by referring to FIGS. 14 and 15. In this embodiment, processes of steps S501 through S508 differ from the computing process (FIGS. 6 and 7) of the GHASH function performed by the information processing apparatus 10 in the first embodiment described above. Hence, in the following, a description will be given of the processes of steps S501 through S508.

In step S501, the hash computation part 130 initializes various local variables and arrays. More particularly, the hash computation part 130 performs the following:

A variable j for representing elements of the array $X_i[16]$ and the array $Y_{i-1}[16]$ is prepared, and j is initialized to 0.

A variable k for judging whether a certain bit is 1 is prepared, and k is initialized to $2^{15}$.

A 16-bit variable x including no sign is prepared. A computation result of the exclusive-OR for every bit of the 2jth elements of the array $X_i[16]$ and the array $Y_{i-1}[16]$, is shifted to the left by 8 bits to obtain a bit string. In addition, a logical sum for every bit of this bit string and a computation result of the exclusive-OR for every bit of the (2j+1)th elements of the array $X_i[16]$ and the array [16], is stored in the variable x. Hence, x is set to $x=((X_1[0]\hat{}Y_{i-1}[0])<<8)|(X_i[1]\hat{}Y_{i-1}[1])$.

A 16-bit array Z[8] having 8 elements for storing a computation result of the GHASH function, and including no sign, is prepared. In addition, each element of the array Z[8] is initialized to 0. That is, the elements are set to Z[0]=0000000000000000, . . . , and Z[7]=0000000000000000.

A 16-bit array V[8] for performing a multiplication (x) on a Galois field, and including no sign, is prepared, and a sub-key H of the GHASH function is stored in the array Z[8]. More particularly, the elements are set to V[0](H[0]<<8)|H[1], V[7]=(H[14]<<8)|H[15].

In step S502, the hash computation part 130 computes the exclusive-OR for every bit for each element of the array Z[8] and the array V[8], and the computation result is substituted into the array Z[8]. More particularly, the hash computation part 130 performs the following process:

An exclusive-OR for every bit of Z[0] and V[0] is computed, and the computed result is substituted into Z[0]. That is, Z[0] is set to Z[0]=Z[0]^V[0].

An exclusive-OR for every bit of Z[1] and V[1] is computed, and the computed result is substituted into Z[1]. That is, Z[1] is set to Z[1]=Z[1]^V[1].

. . .

An exclusive-OR for every bit of Z[7] and V[7] is computed, and the computed result is substituted into Z[7]. That is, Z[7] is set to Z[7]=Z[7]^V[7].

In step S503, the hash computation part 130 judges whether j is smaller than 7. In a case in which j is smaller than 7, the hash computation part 130 advances the process to step S504. On the other hand, in a case in which is j is less than or equal to 7 (that is, in a case in which j is 7), the hash computation part 130 advances the process to step S508. The case in which j is 7 is the case in which the computation process of one block $X_i$, segmented from the authentication target message 1000, is completed.

In step S504, the hash computation part 130 performs the following substitution process:

$2^{15}$ is substituted into k.

A result of adding 1 to the value of j is substituted into j. In other words, the value of j is incremented.

A computation result of the exclusive-OR for every bit of $X_i[2j]$ and $Y_{i-1}[2j]$, is shifted to the left by 8 bits to obtain a bit string. In addition, a logical sum for every bit of this bit string and a computation result of the exclusive-OR for every bit of $X_i[2j+1]$ and $Y_{i-1}[2j+1]$, is substituted into x. That is, x is set to $x=((X_i[2j]\hat{}Y_{i-1}[2j])<<8)|(X_i[2j+1]\hat{}Y_{i-1}[2j+1])$.

In step S505, the hash computation part 130 judges whether a computation result of a logical product for every bit of V[7] and 1 is 0. That is, the hash computation part 130 judges whether the least significant bit of V[7] is 0. In a case in which the computation result of the logical product for every bit of V[7] and 1 is not 0 (that is, in the case in which the computation result is 1), the hash computation part 130 advances the process to step S506. On the other hand, in a case in which the computation result of the logical product for every bit of V[7] and 1 is 0, the hash computation part 130 advances the process to step S212.

In step S506, the hash computation part 130 substitutes a hexadecimal value "0xE100" into a 16-bit variable r that includes no sign. In other words, the hash computation part 130 substitutes a bit string "1110000100000000" into r. This corresponds to the upper 16 bits of the bit string corresponding to the irreducible polynomial $x^{127}+x^{126}+x^{125}+x^{120}$ of the Galois field $GF(2^{128})$.

In step S507, the hash computation part 130 performs the following computing process and the substitution process with respect to the array V[8]:

A logical sum is computed for every bit of a result of shifting V[7] to the right by 1 bit and a result of shifting V[6] to the left by 15 bits, and the computed logical sum is substituted into V[7]. That is, V[7] is set to V[7]=(V[7]>>1)|V[6]<<15).

A logical sum is computed for every bit of a result of shifting V[6] to the right by 1 bit and a result of shifting V[5] to the left by 15 bits, and the computed logical sum is substituted into V[6]. That is, V[6] is set to V[6]=(V[6]>>1)|V[5]<<15).

A logical sum is computed for every bit of a result of shifting V[1] to the right by 1 bit and a result of shifting V[0] to the left by 15 bits, and the computed logical sum is substituted into V[1]. That is, V[1] is set to V[1]=(V[1]>>1)|V[0]<<15).

An exclusive-OR is computed for every bit of a result of shifting V[0] to the right by 1 bit and r, and the computed exclusive-OR is substituted into V[0]. That is, V[0] is set to V[0]=(V[0]>>1)^r.

In a case in which the bit strings stored in V[0] through V[7] are arranged in a sequence from the left and regarded as a bit string V, the process of step S507 described above is equivalent to shifting this bit string V to the right by 1 bit, and computing an exclusive-OR of the upper 16 bits of this shifted bit string V and r.

In step S508, the hash computation part 130 performs the following substitution process:

A result of adding 1 to the value of i is substituted into i. In other words, the value of i is incremented.

The lower 8 bits of a result of shifting Z[0] to the right by 8 bits is substituted into $Y_{i-1}[0]$. That is, $Y_{i-1}[0]$ is set to $Y_{i-1}[0]=(Z[0]>>8)\&0xFF$.

The lower 8 bits of Z[0] is substituted into $Y_{i-1}[1]$. That is, $Y_{i-1}[1]$ is set to $Y_{i-1}[1]=Z[0]\&0xFF$.

. . .

The lower 8 bits of a result of shifting Z[7] to the right by 8 bits is substituted into $Y_{i-1}[14]$. That is, $Y_{i-1}[14]$ is set to $Y_{i-1}[14]=(Z[7]>>8)\&0xFF$.

The lower 8 bits of Z[7] is substituted into $Y_{i-1}[15]$. That is, $Y_{i-1}[15]$ is set to $Y_{i-1}[15]=Z[7]\&0xFF$.

As described above, in the information processing apparatus 10 in this embodiment, the computing process of the GHASH function is performed using the 16-bit array V[8] that includes no sign and the array Z[8]. Hence, it is possible to reduce the number of shift operations or the like to be performed with respect to the array V[8]. For this reason, the computing time of the GHASH function can be reduced by the information processing apparatus 10 in this fourth embodiment.

In addition, by setting the array V[8] to 16 bits including no sign, in a case in which the MPU 16 of the information processing apparatus 10 is formed by a 16-bit MPU, for example, the computing time of the GHASH function can further be reduced.

Fifth Embodiment

Next, a description will be given of the information processing apparatus 10 in a fifth embodiment. In this embodiment, the computing process of the GHASH function uses a 32-bit array V[4] including no sign and an array Z[4], in place of using the 8-bit array V[16] including no sign and the array Z[16]. The functional configuration of the information processing apparatus 10 in this embodiment is similar to the functional configuration of the information processing apparatus 10 in the first embodiment.

<Details of Process>

Next, a description will be given of details of the process of the information processing apparatus 10 in this embodiment, by referring to the drawings. The computing process of the GHASH function in the information processing apparatus 10 in this embodiment differs from that of the first embodiment.

<<Computing Process of GHASH Function>>

Figure 16:
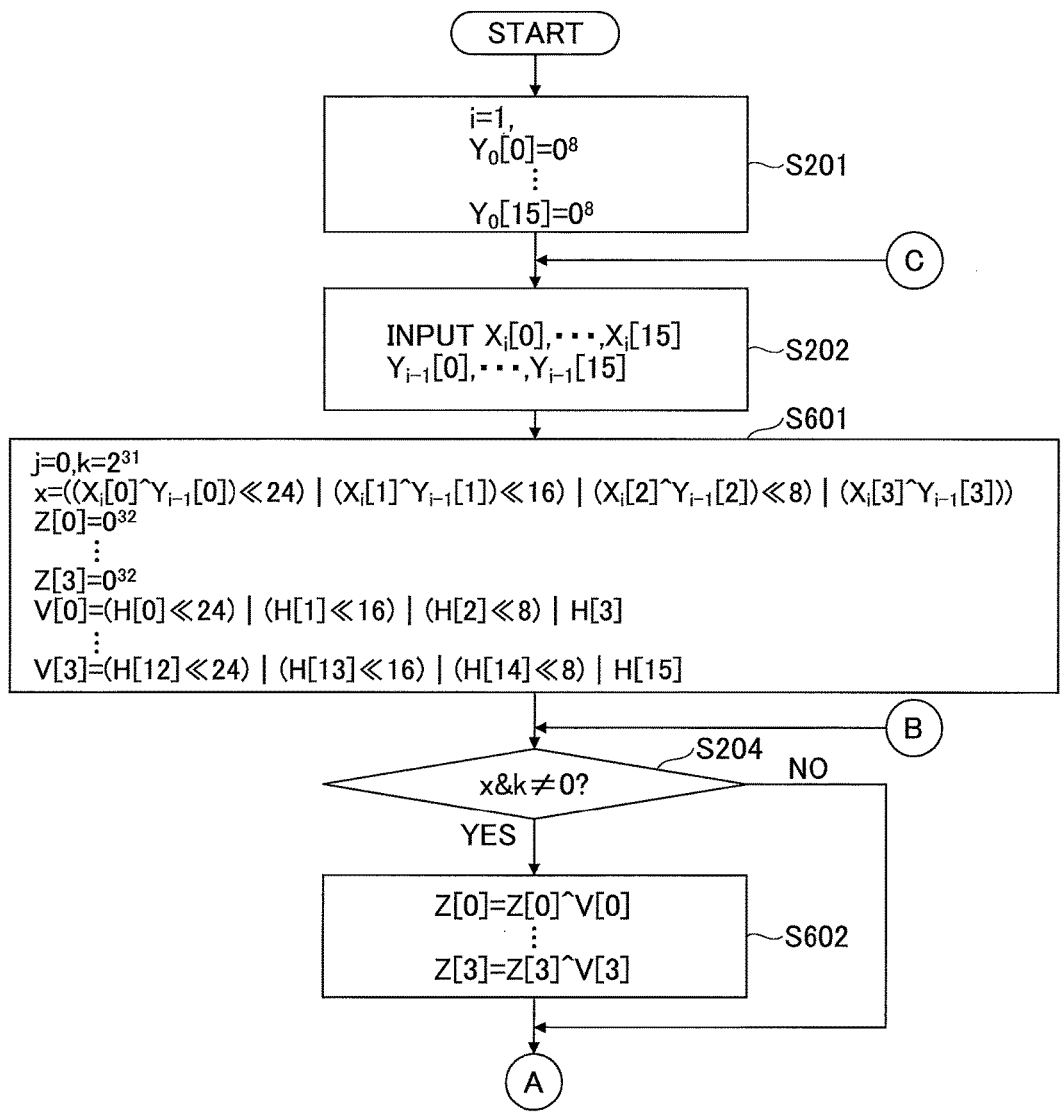
FIG. 16 is a flow chart (1/2) of an example the computing process of the GHASH function in a fifth embodiment.
Figure 17:
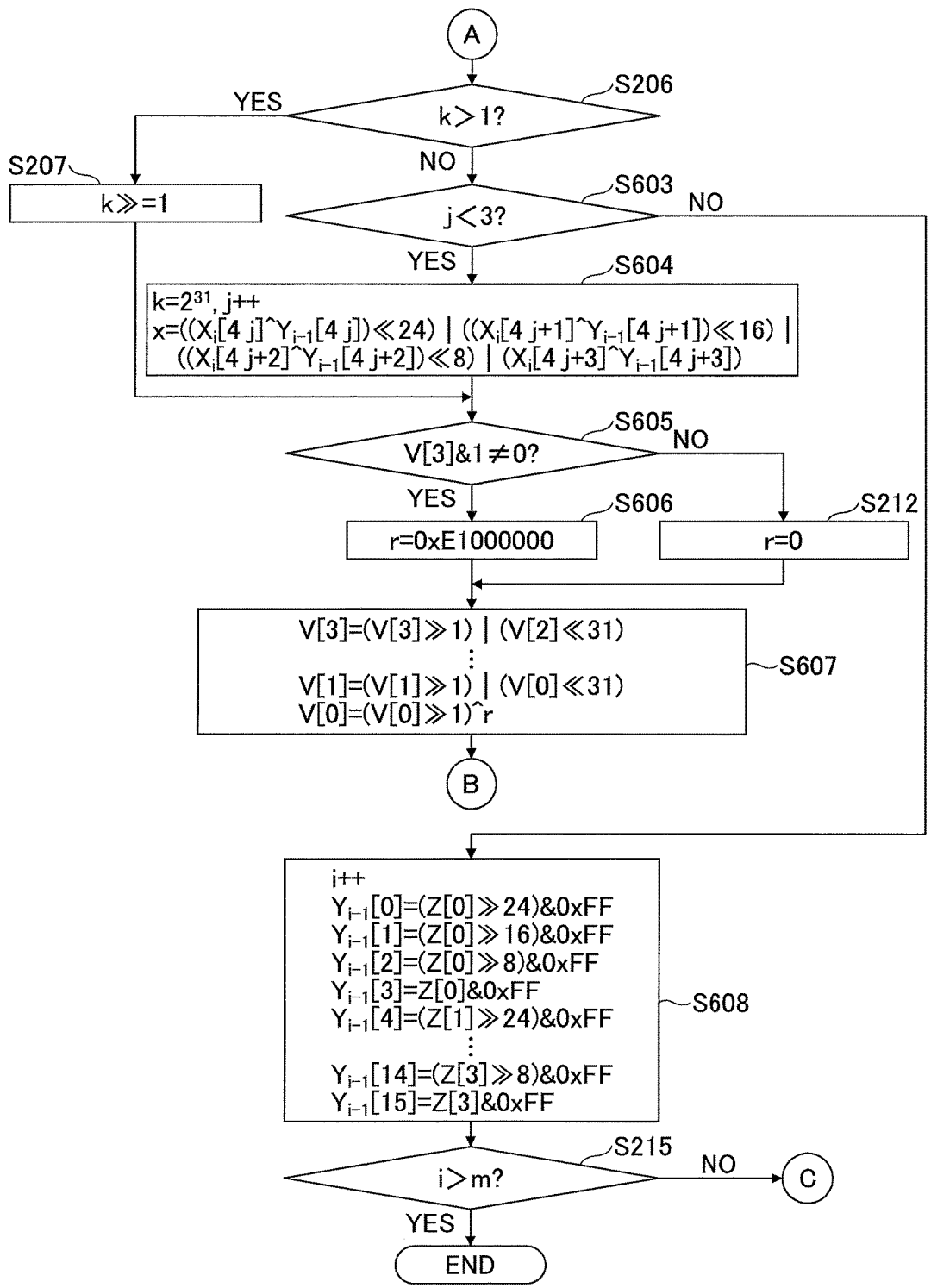
FIG. 17 is a flow chart (2/2) of the example of the computing process of the GHASH function in the fifth embodiment.

Next, a detailed description will be given of the computing process of the GHASH function in this embodiment, in step S102 illustrated in FIG. 4 described above, by referring to FIGS. 16 and 17. In this embodiment, processes of steps S601 through S608 differ from the computing process (FIGS. 6 and 7) of the GHASH function performed by the information processing apparatus 10 in the first embodiment described above. Hence, in the following, a description will be given of the processes of steps S601 through S608.

In step S601, the hash computation part 130 initializes various local variables and arrays. More particularly, the hash computation part 130 performs the following:

A variable j for representing elements of the array $X_i[16]$ and the array $Y_{i-1}[16]$ is prepared, and j is initialized to 0.

A variable k used for judging whether a specific bit is 1 is prepared, and k is initialized to $2^{31}$.

A 32-bit variable x that includes no sign, is prepared, and x is set to x=(($X_i[0]$^$Y_{i-1}[0]$)<<24)|(($X_i[1]$^$Y_{i-1}[1]$)<<16)|(($X_i[2]$ ^$Y_{i-1}[2]$)<<8)|($X_i[3]$^$Y_{i-1}[3]$).

A 32-bit array Z[4] including 4 elements for storing the computed result of the GHASH function and including no sign is prepared, and the elements of Z[4] are initialized to 0. That is, Z[4] is set to Z[0]=$0^{32}$, . . . , Z[3]=$0^{32}$.

A 32-bit array V[4] for performing a multiplication (x) on the Galois field and including no sign is prepared, and the sub-key H of the GHASH function is stored in the array V[4]. More particularly, V[4] is set to V[0]=(H[0]<<24) I (H[1]<<16)|(H[2]<<8)|H[3], . . . , V[3]=(H[12]<<24)|(H[13]<<16)|(H[14]<<8)|H[15].

In step S602, the hash computation part 130 computes an exclusive-OR for every bit for each element of the array Z[4] and the array V[4], and substitutes the computed result into the array Z[4]. More particularly, the hash computation part 130 performs the following process:

An exclusive-OR for every bit of Z[0] and V[0] is computed, and the computed result is substituted into Z[0]. That is, Z[0] is set to Z[0]=Z[0]^V[0].

An exclusive-OR for every bit of Z[1] and V[1] is computed, and the computed result is substituted into Z[1]. That is, Z[1] is set to Z[1]=Z[1]^V[1].

. . .

An exclusive-OR for every bit of Z[3] and V[3] is computed, and the computed result is substituted into Z[3]. That is, Z[3] is set to Z[3]=Z[3]^V[3].

In step S603, the hash computation part 130 judges whether j is smaller than 3. In a case in which j is smaller than 3, the hash computation part 130 advances the process to step S604. On the other hand, in a case in which j is less than or equal to 3 (that is, in a case in which j is 3), the hash computation part 130 advances the process to step S608. The case in which j is 3 is the case in which the computation process of one block $X_i$, segmented from the authentication target message 1000, is completed.

In step S604, the hash computation part 130 performs the following substitution process:

$2^{31}$ is substituted into k.

A result of adding 1 to the value of j is substituted into j. In other words, the value of j is incremented.

x is set to x=(($X_i[4j]$^$Y_{i-1}[4j]$)<<24)|(($X_i[4j+1]$^ $Y_{i-1}[4j+1]$)<<16)|(($X_i[4j+2]$^$Y_{i-1}[4j+2]$)<<8)|($X_i[4j+3]$^$Y_{i-1}[4j+3]$).

In step S605, the hash computation part 130 judges whether a computation result of a logical product for every bit of V[3] and 1 is 0. That is, the hash computation part 130 judges whether the least significant bit of V[3] is 0. In a case in which the computation result of the logical product for every bit of V[3] and 1 is not 0 (that is, in the case in which the computation result is 1), the hash computation part 130 advances the process to step S606. On the other hand, in a case in which the computation result of the logical product for every bit of V[3] and 1 is 0, the hash computation part 130 advances the process to step S212.

In step S606, the hash computation part 130 substitutes a hexadecimal value "0xE1000000" into a 16-bit variable r that includes no sign. In other words, the hash computation part 130 substitutes a bit string in which the upper 8 bits are "11100001" and the lower 24 bits are "0"s into r. This corresponds to the upper 32 bits of the bit string corresponding to the irreducible polynomial $x^{127}+x^{126}+x^{125}+x^{120}$ of the Galois field GF($2^{128}$).

In step S607, the hash computation part 130 performs the following computing process and the substitution process with respect to the array V[4]:

A logical sum is computed for every bit of a result of shifting V[3] to the right by 1 bit and a result of shifting V[2] to the left by 31 bits, and the computed logical sum is substituted into V[3]. That is, V[3] is set to V[3]= (V[3]>>1)|V[2]<<31).

A logical sum is computed for every bit of a result of shifting V[2] to the right by 1 bit and a result of shifting V[1] to the left by 31 bits, and the computed logical sum is substituted into V[2]. That is, V[2] is set to V[2]= (V[2]>>1)|V[1]<<31).

A logical sum is computed for every bit of a result of shifting V[1] to the right by 1 bit and a result of shifting V[0] to the left by 31 bits, and the computed logical sum is substituted into V[1]. That is, V[1] is set to V[1]= (v[1]>>1)|V[0]<<31).

An exclusive-OR is computed for every bit of a result of shifting V[0] to the right by 1 bit and r, and the computed exclusive-OR is substituted into V[0]. That is, V[0] is set to V[0]=(V[0]>>1)^r.

In a case in which the bit strings stored in V[0] through V[3] are arranged in a sequence from the left and regarded as a bit string V, the process of step S607 described above is equivalent to shifting this bit string V to the right by 1 bit, and computing an exclusive-OR of the upper 32 bits of this shifted bit string V and r.

In step S608, the hash computation part 130 performs the following substitution process:

A result of adding 1 to the value of i is substituted into i. In other words, the value of i is incremented.

The lower 8 bits of a result of shifting Z[0] to the right by 24 bits is substituted into $Y_{i-1}[0]$. That is, $Y_{i-1}[0]$ is set to $Y_{i-1}[0]=(Z[0]>>24)\&0xFF$.

The lower 8 bits of a result of shifting Z[0] to the right by 16 bits is substituted into $Y_{i-1}[1]$. That is, $Y_{i-1}[1]$ is set to $Y_{i-1}[1]=(Z[0]>>16)\&0xFF$.

The lower 8 bits of a result of shifting Z[0] to the right by 8 bits is substituted into $Y_{i-1}[2]$. That is, $Y_{i-1}[2]$ is set to $Y_{i-1}[2]=(Z[0]>>8)\&0xFF$.

The lower 8 bits of Z[0] is substituted into $Y_{i-1}[3]$. That is, $Y_{i-1}[3]$ is set to $Y_{i-1}[3]=Z[0]\&0xFF$.

. . .

The lower 8 bits of a result of shifting Z[1] to the right by 24 bits is substituted into $Y_{i-1}[4]$. That is, $Y_{i-1}[4]$ is set to $Y_{i-1}[4]=(Z[1]>>24)\&0xFF$.

The lower 8 bits of a result of shifting Z[3] to the right by 8 bits is substituted into $Y_{i-1}[14]$. That is, $Y_{i-1}[14]$ is set to $Y_{i-1}[14]=(Z[3]>>8)\&0xFF$.

The lower 8 bits of Z[3] is substituted into $Y_{i-1}[15]$. That is, $Y_{i-1}[15]$ is set to $Y_{i-1}[15]=Z[3]\&0xFF$.

As described above, in the information processing apparatus 10 in this embodiment, the computing process of the GHASH function is performed using the 32-bit array V[4] that includes no sign and the array Z[4]. Hence, it is possible to reduce the number of shift operations or the like to be performed with respect to the array V[4]. For this reason, the computing time of the GHASH function can be reduced by the information processing apparatus 10 in this fifth embodiment when compared to the fourth embodiment.

In addition, by setting the array V[4] to 32 bits including no sign, in a case in which the MPU 16 of the information processing apparatus 10 is formed by a 32-bit MPU, for example, the computing time of the GHASH function can further be reduced.

In the embodiments, the segmentation part 120 is an example of a segmenting means. The hash computation part 130 is an example of a hash computing means. The authentication tag generation part 140 is an example of an authentication tag generating means.

The present invention is not limited to the disclosed embodiments specifically described above, and various combinations, variations, and modifications may be made without departing from the scope of the present invention recited in the claims.

This application is based upon Japanese Patent Application No. 2014-081338 filed on Apr. 10, 2014, the entire contents of which are incorporated herein by reference.

DESCRIPTION OF THE REFERENCE NUMERALS

10 Information Processing Apparatus
11 MPU
12 RAM
13 ROM
14 External I/F
110 Encryption Part
120 Segmentation Part
130 Hash Computation Part
140 Authentication Tag Generation Part
1000 Authentication Target Message
2000 Conversion Table
B Bus

The invention claimed is:

1. An information processing apparatus embedded in an electronic apparatus, comprising:
a storage that stores a program; and
a processor that executes the program to perform a process including
segmenting an authentication target message into one or more blocks for every 128 bits, the authentication target message including at least a predetermined authentication parameter, and first encryption information that is obtained by encrypting plaintext information by block encryption;
successively computing each of the one or more blocks by a GHASH function including a predetermined algorithm;
generating second encryption information by encrypting for each block, using the block encryption, a computed result of the GHASH function, and generating, from the second encryption information, an authentication tag for authenticating a completeness of the first encryption information and an identity that decrypts the first encryption information, wherein the GHASH function uses a predetermined array of 128 bits and computes a number of times a shift operation to shift information stored in the predetermined array by 1 bit to the right is required, to perform, in one operation, the shift operation amounting to the computed number of times the shift operation to shift the information by 1 bit to the right is required; and
storing a conversion table in which a bit string corresponding to an irreducible polynomial of a Galois field represented by $GF(2^{128})$ is converted according to the number of times the shift operation to shift the information stored in the predetermined array of the predetermined algorithm by 1 bit to the right is required,
wherein the GHASH function computes an exclusive-OR of the information stored in the predetermined array and a bit string after conversion, using the bit string after conversion in the conversion table, according to the number of times the shift operation is required, with respect to an exclusive-OR of the information stored in the predetermined array of the predetermined algorithm and the bit string.

2. The information processing apparatus as claimed in claim 1, wherein the predetermined array is an array including 8 16-bit elements.

3. The information processing apparatus as claimed in claim 1, wherein the predetermined array is an array including 4 32-bit elements.

4. The information processing apparatus as claimed in claim 1, wherein the predetermined array is an array including 16 8-bit elements.

5. A method of encrypting information by a processor embedded in an electronic apparatus, comprising:
segmenting, by the processor, an authentication target message into one or more blocks for every 128 bits, the authentication target message including at least a predetermined authentication parameter, and first encryption information that is obtained by encrypting plaintext information by block encryption;
successively computing, by the processor, each of the one or more blocks by a GHASH function including a predetermined algorithm;

generating, by the processor, second encryption information by encrypting for each block, using the block encryption, a computed result of the GHASH function, and generating, from the second encryption information, an authentication tag for authenticating a completeness of the first encryption information and an identity that decrypts the first encryption information, wherein the GHASH function uses a predetermined array of 128 bits and computes a number of times a shift operation to shift information stored in the predetermined array by 1 bit to the right is required, to perform, in one operation, the shift operation amounting to the computed number of times the shift operation to shift the information by 1 bit to the right is required; and storing, by the processor, a conversion table in which a bit string corresponding to an irreducible polynomial of a Galois field represented by $GF(2^{128})$ is converted according to the number of times the shift operation to shift the information stored in the predetermined array of the predetermined algorithm by 1 bit to the right is required, wherein the GHASH function computes an exclusive-OR of the information stored in the predetermined array and a bit string after conversion, using the bit string after conversion in the conversion table, according to the number of times the shift operation is required, with respect to an exclusive-OR of the information stored in the predetermined array of the predetermined algorithm and the bit string.

6. A non-transitory computer-readable storage medium that stores a program which, when executed by a computer embedded in an electronic apparatus, performs a process comprising:

segmenting an authentication target message into one or more blocks for every 128 bits, the authentication target message including at least a predetermined authentication parameter, and first encryption information that is obtained by encrypting plaintext information by block encryption;

successively computing each of the one or more blocks by a GHASH function including a predetermined algorithm;

generating second encryption information by encrypting for each block, using the block encryption, a computed result of the GHASH function, and generating, from the second encryption information, an authentication tag for authenticating a completeness of the first encryption information and an identity that decrypts the first encryption information, wherein the GHASH function uses a predetermined array of 128 bits and computes a number of times a shift operation to shift information stored in the predetermined array by 1 bit to the right is required, to perform, in one operation, the shift operation amounting to the computed number of times the shift operation to shift the information by 1 bit to the right is required; and storing a conversion table in which a bit string corresponding to an irreducible polynomial of a Galois field represented by $GF(2^{128})$ is converted according to the number of times the shift operation to shift the information stored in the predetermined array of the predetermined algorithm by 1 bit to the right is required, wherein the GHASH function computes an exclusive-OR of the information stored in the predetermined array and a bit string after conversion, using the bit string after conversion in the conversion table, according to the number of times the shift operation is required, with respect to an exclusive-OR of the information stored in the predetermined array of the predetermined algorithm and the bit string.

* * * * *